United States Patent
Kwon et al.

(10) Patent No.: US 8,897,406 B2
(45) Date of Patent: Nov. 25, 2014

(54) COMMUNICATION SYSTEM WITH ITERATIVE DETECTOR AND DECODER AND METHOD OF OPERATION THEREOF

(75) Inventors: Hyukjoon Kwon, San Diego, CA (US); Jungwon Lee, San Diego, CA (US); Inyup Kang, San Diego, CA (US)

(73) Assignee: Samsung Electronics Co., Ltd., Gyeonggi-Do (KR)

( * ) Notice: Subject to any disclaimer, the term of this patent is extended or adjusted under 35 U.S.C. 154(b) by 104 days.

(21) Appl. No.: 13/460,630

(22) Filed: Apr. 30, 2012

(65) Prior Publication Data

US 2013/0287148 A1 Oct. 31, 2013

(51) Int. Cl.
*H04N 1/10* (2006.01)

(52) U.S. Cl.
USPC ........................................... 375/350

(58) Field of Classification Search
CPC .................................... H04L 1/0026
USPC ................................. 375/350, 341
See application file for complete search history.

(56) References Cited

U.S. PATENT DOCUMENTS

| | | | |
|---|---|---|---|
| 7,986,752 B2 | 7/2011 | Nikopour-Deilami et al. | |
| 8,054,904 B2 | 11/2011 | Hwang et al. | |
| 2005/0157811 A1 | 7/2005 | Bjerke et al. | |
| 2005/0174983 A1 | 8/2005 | Naguleswaran et al. | |
| 2005/0201478 A1 | 9/2005 | Claussen et al. | |
| 2007/0297496 A1 | 12/2007 | Park et al. | |
| 2009/0262872 A1* | 10/2009 | Prasad et al. | 375/341 |
| 2010/0220708 A1 | 9/2010 | Mantravadi et al. | |

FOREIGN PATENT DOCUMENTS

EP 1724959 A1 11/2006
KR 10-2008-0050205 A 6/2008

OTHER PUBLICATIONS

Choi et al., "Improved Linear Soft-input Soft-output Detection Via Soft Feedback Successive Interference Cancellation", "Transactions on Communications", Mar. 2010, pp. 112, vol. 58, No. 3, Publisher: IEEE.

Manchon et al., "On the Design of a MIMO-SIC Receiver for LTE Downlink", "Proceedings of IEEE 68th Vehicular Technology Conference, 2008", Fall-2008, pp. 15, vol. 68, Publisher: IEEE.

International Search Report for PCT/KR2013/001860 mailed on Jun. 24, 2013.

* cited by examiner

*Primary Examiner* — Tanmay Shah
(74) *Attorney, Agent, or Firm* — IP Investment Law Group

(57) ABSTRACT

A method of operation of a communication system includes: receiving an input signal having an input primary codeword and an input parallel codeword; calculating a primary codeword signal by removing a parallel soft information average of the input parallel codeword from the input signal; filtering a residual parallel interference of the input parallel codeword from the primary codeword signal with a primary whitening filter to generate a primary codeword estimation of the input primary codeword; and calculating a primary detected soft information for the primary codeword estimation for communicating with a device.

20 Claims, 7 Drawing Sheets

COMMUNICATION SYSTEM WITH ITERATIVE DETECTOR AND DECODER AND METHOD OF OPERATION THEREOF

TECHNICAL FIELD

The present invention relates generally to a communication system, and more particularly to a system for detecting and decoding communication signals.

BACKGROUND ART

Modern portable consumer and industrial electronics, such as navigation systems, cellular phones, portable digital assistants, and combination devices, are providing increasing levels of functionality to support modern life including mobile communication. As users become more empowered with the growth of mobile communication technology, new and old paradigms begin to take advantage of this new device space.

The ever increasing need for information in modern life requires users to have access to information at all times, at increasing data rates. However, signals used in mobile communication effectively experience various types of interference from numerous sources, which affect the quality and speed of the accessible data.

Thus, a need still remains for a communication system with iterative detection and decoding. In view of the increasing consumer needs, it is increasingly critical that answers be found to these problems. In view of the ever-increasing commercial competitive pressures, along with growing consumer expectations and the diminishing opportunities for meaningful product differentiation in the marketplace, it is critical that answers be found for these problems. Additionally, the need to reduce costs, improve efficiencies and performance, and meet competitive pressures adds an even greater urgency to the critical necessity for finding answers to these problems.

Solutions to these problems have been long sought but prior developments have not taught or suggested any solutions and, thus, solutions to these problems have long eluded those skilled in the art.

DISCLOSURE OF THE INVENTION

The present invention provides a method of operation of a communication system including: receiving an input signal having an input primary codeword and an input parallel codeword; calculating a primary codeword signal by removing a parallel soft information average of the input parallel codeword from the input signal; filtering a residual parallel interference of the input parallel codeword from the primary codeword signal with a primary whitening filter to generate a primary codeword estimation of the input primary codeword; and calculating a primary detected soft information for the primary codeword estimation for communicating with a device.

The present invention provides a communication system, including: a signal receiver module for receiving an input signal having an input primary codeword and an input parallel codeword; an primary interference cancellation module, coupled to the signal receiver module, for calculating a primary codeword signal by removing a parallel soft information average of the input parallel codeword from the input signal; a primary signal whitening module, coupled to the primary interference cancellation module, for filtering a residual parallel interference of the input parallel codeword from the primary codeword signal with a primary whitening filter to generate a primary codeword estimation of the input primary codeword; and a primary modified detection module, coupled to the primary signal whitening module, for calculating a primary detected soft information for the primary codeword estimation for communicating with a device.

Certain embodiments of the invention have other steps or elements in addition to or in place of those mentioned above. The steps or elements will become apparent to those skilled in the art from a reading of the following detailed description when taken with reference to the accompanying drawings.

BEST MODE FOR CARRYING OUT THE INVENTION

Figure 1:
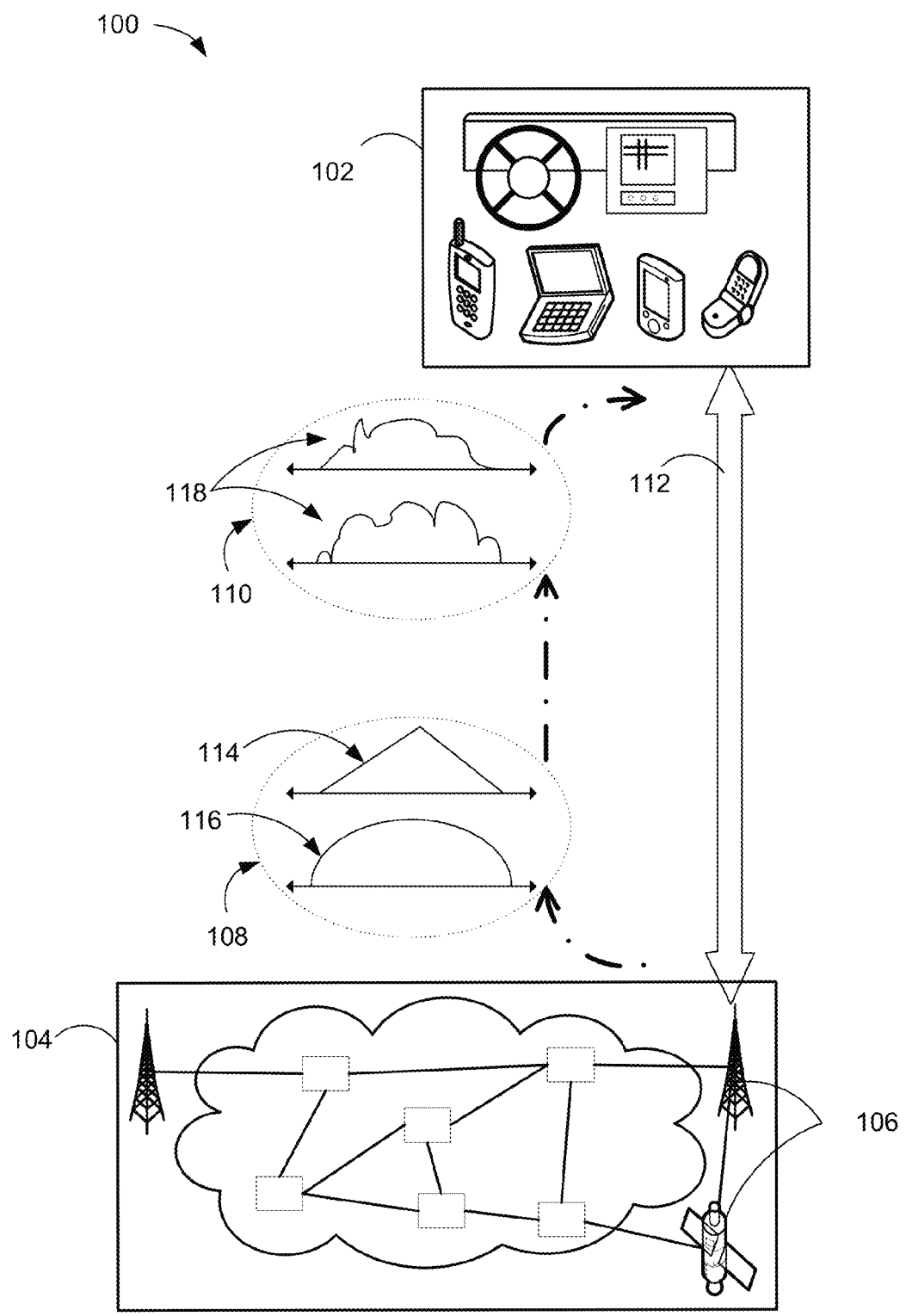
FIG. 1 is a communication system with codeword detection mechanism in an embodiment of the present invention.

The following embodiments are described in sufficient detail to enable those skilled in the art to make and use the invention. It is to be understood that other embodiments would be evident based on the present disclosure, and that system, process, or mechanical changes may be made without departing from the scope of the present invention.

In the following description, numerous specific details are given to provide a thorough understanding of the invention. However, it will be apparent that the invention may be practiced without these specific details. In order to avoid obscuring the present invention, some well-known circuits, system configurations, and process steps are not disclosed in detail.

The drawings showing embodiments of the system are semi-diagrammatic and not to scale and, particularly, some of the dimensions are for the clarity of presentation and are shown exaggerated in the drawing FIGs. Similarly, although the views in the drawings for ease of description generally show similar orientations, this depiction in the FIGs. is arbitrary for the most part. Generally, the invention can be operated in any orientation.

The term "module" referred to herein can include software, hardware, or a combination thereof in accordance with the context in which the term is used. For example, the software can be machine code, firmware, embedded code, and application software. Also for example, the hardware can be circuitry, processor, computer, integrated circuit, integrated circuit cores, a pressure sensor, an inertial sensor, a microelectromechanical system (MEMS), passive devices, or a combination thereof.

The term "processing" as used herein includes filtering signals and decoding symbols. For example, processing of a signal can include filtering noise or interference or detecting a symbol or codeword in signal.

Referring now to FIG. 1, therein is shown a communication system 100 with codeword detection mechanism in an embodiment of the present invention. The communication system 100 includes a designated mobile station 102, such as a cellular phone or a notebook computer, connected to a network 104. The network 104 is defined as a system of wires, wired or wireless communications devices, or a combination thereof that are connected to each other for enabling communication between devices.

For example, the network 104 can be a combination wireless cellular phone network having base stations, communication towers and antennae, telephone network, servers, or client devices that are used to enable wireless communication. Also, for example, the network 104 can be a combination of wired or wireless routers, Ethernet cables, computers, or servers for local area networks.

The network 104 can include a network base station 106 that is used to receive, transmit, relay, process or combination thereof, for wireless signals. The network base station 106 can facilitate the communication with the designated mobile station 102 by sending, receiving, and relaying communication signals to and from the designated mobile station 102. The designated mobile station 102 can be connected to the network 104 through the network base station 106.

For example, the network base station 106 can be a cell tower, a wireless router, an antenna, or a combination thereof being used to send signals to or receive signals from the designated mobile station 102, such as a laptop computer or a cellular phone. The network base station 106 can relay the signal through the network 104 to enable communication with other user equipment, server, computer, or a combination thereof.

The network base station 106 can be used to transmit the communication signals, such as voice signals of a telephone call or a webpage. The network base station 106 can also send reference signals or broadcast previously determined training signals to the designated mobile station 102. The designated mobile station 102 can receive and process signals from the network base station 106.

Based on the communication method, such as code division multiple access (CDMA), orthogonal frequency-division multiple access (OFDMA), Third Generation Partnership Project (3GPP) Long Term Evolution (LTE), or the fourth generation (4G) telecommunication standards, the communication signals can also have reference signals imbedded in the communicated information. The reference signals can exist as a predetermined bit, pulse, wave, or a combination thereof. The reference signals can be embedded within the communicated information at a regular time interval, frequency, code, or a combination thereof.

The designated mobile station 102 can communicate with the network base station 106 through a communication channel 112. The communication channel 112 can be wireless, wired, or a combination thereof. The communication channel 112 can also include repeaters, amplifiers, or a combination thereof.

For example, the communication channel 112 can encompass frequency, time slot, packet designation, channel code, or combination thereof used for transmission of signals. Also, for example, the communication channel 112 can include the behavior of the medium, such as reflection and loss caused by wires or refractions and obstructions in wireless environments.

The network base station 106 can transmit a base transmission signal 108. The base transmission signal 108 can include the information sent to the designated mobile station 102, other users or receivers, or a combination thereof. The base transmission signal 108 can be formatted according to protocols or standards. For example, the base transmission signal 108 can have multiplexing scheme, modulation, signal strength, carrier frequency, synchronizing symbols or code-words, error checking or correcting bits, such as parity information, or a combination thereof controlled by protocols or standards.

For illustrative purposes, the network base station 106 will be described as transmitting signals and the designated mobile station 102 as receiving and replying to the transmitted signals. However, it is understood that both the designated mobile station 102 and the network base station 106 can each transmit and receive signals.

The communication system 100 can employ a multiple-input and multiple-output (MIMO) scheme for communicating with the various users through multiple antennas. The communication system 100 transmitting the base transmission signal 108 in the MIMO scheme can have a primary layer 114 and a parallel layer 116.

The primary layer 114 can be a set of information communicated through a particular antenna or a particular set of antennas. The parallel layer 116 can be a set of information, that is the same or different from that of the primary layer 114, which is communicated through an antenna or a set of antennas different from that of the primary layer 114. Each layer can transmit a group of information to a specific user.

For illustrative purposes, the base transmission signal 108 will be described as having one each of the primary layer 114 and the parallel layer 116. However, it is understood that the base transmission signal 108 can have more layers. Further, it is understood that the base transmission signal 108 can have more than one layer dedicated to the designated mobile station 102, other user, or a combination thereof.

For further illustrative purposes, the number of antennas at the designated mobile station 102 will be described as being greater than or equal to the number of antennas at the network base station 106 used to transmit to the designated mobile station 102. However, it is understood that the number of antennas at the designated mobile station 102 can be less than that of the network base station 106.

The designated mobile station 102 can receive an input signal 110. The input signal 110 is defined as the overall signal perceived at the designated mobile station 102. For example, the input signal 110 can include the base transmission signal 108, white noise, interference due to transmission from other base stations, signal distortion, interference due to the channel, other received noise or interference, or a combination thereof. The designated mobile station 102 can process the information in the input signal 110, relay the information to the user, such as by displaying or creating sounds, or a combination thereof.

The input signal 110 can be the base transmission signal 108 received at the designated mobile station 102 after the base transmission signal 108 travels through the communication channel 112. The base transmission signal 108 can experience a signal distortion 118 such that the input signal 110 is not identical to the base transmission signal 108. The signal distortion 118 can be caused by channel gain, reflections, refractions, delay spread, phase shift, interference between the layers, signal from other sources, or a combination thereof.

Figure 2:
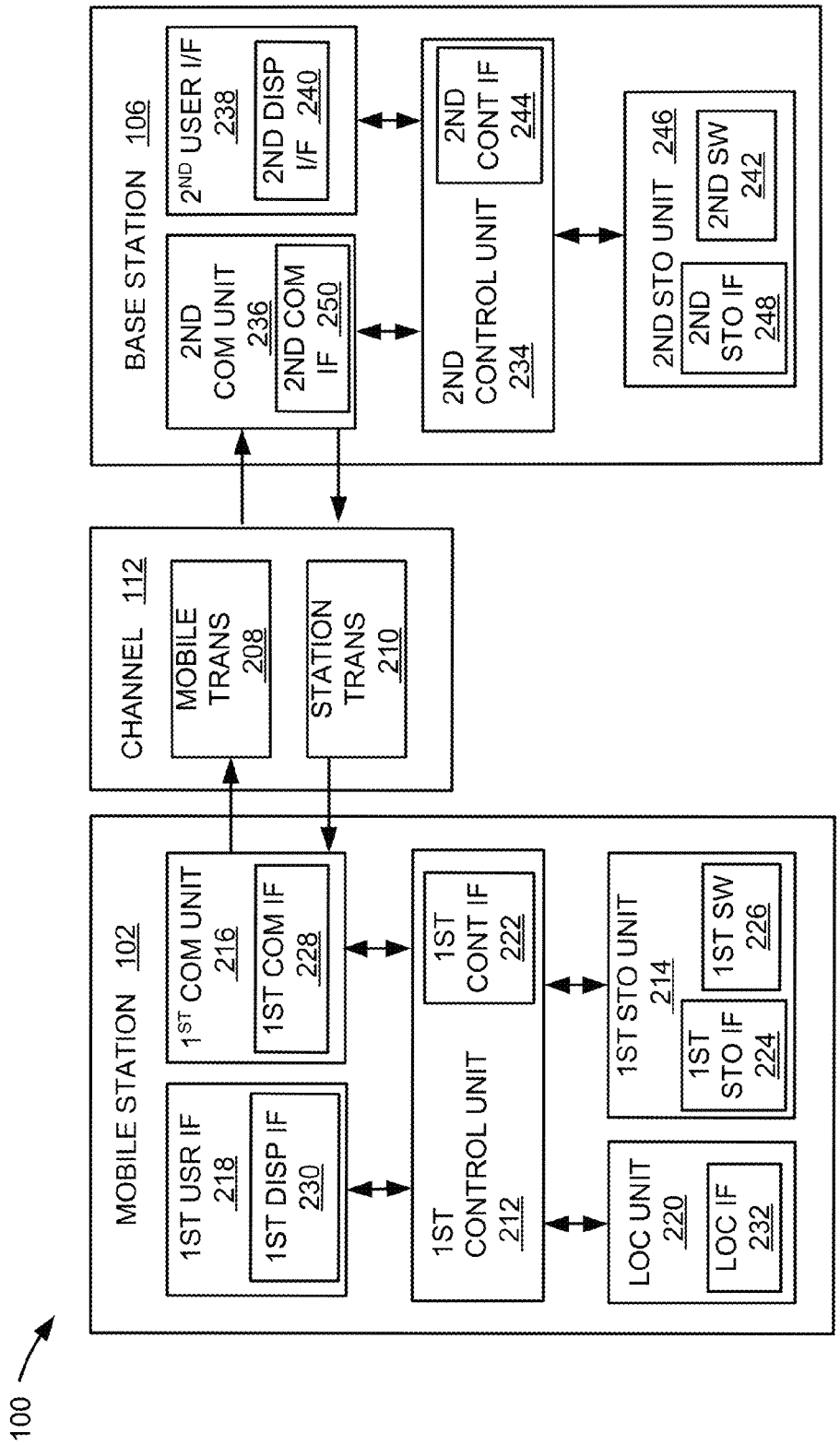
FIG. 2 is an exemplary block diagram of the communication system.

Referring now to FIG. 2, therein is shown an exemplary block diagram of the communication system 100. The communication system 100 can include the designated mobile station 102, the communication channel 112, and the network base station 106. The designated mobile station 102 can communicate within the network 104 of FIG. 1, such as the network base station 106, other mobile stations, or other users, over the communication channel 112.

For illustrative purposes, the communication system 100 will be described as having the designated mobile station 102 interacting with the network base station 106 through the communication channel 112. It is understood that the designated mobile station 102 can communicate with other stations in the network 104 of FIG. 1 and with other components in the network 104.

For example, the designated mobile station 102 can communicate with multiple base stations for handovers. Also, for example, the designated mobile station 102 can communicate with cellular phones in other areas through the network base station 106 and the network 104.

The designated mobile station 102 can send information in a mobile transmission 208 over the communication channel 112 to the network base station 106. The network base station 106 can send information in a station transmission 210 over the communication channel 112 to the designated mobile station 102.

For brevity of description in this embodiment of the present invention, the designated mobile station 102 will be described as a client device and the network base station 106 will be described as communication base station, such as a communications tower. The present invention is not limited to this selection for the type of devices. The selection is an example of the present invention.

The designated mobile station 102 can include a first control unit 212, a first storage unit 214, a first communication unit 216, a first user interface 218, and a location unit 220. The designated mobile station 102 can be similarly described by the designated mobile station 102. The first control unit 212 can include a first control interface 222. The first storage unit 214 can include a first storage interface 224.

The first control unit 212 can execute a first software 226 to provide the intelligence of the communication system 100. The first control unit 212 can operate the first user interface 218 to display information generated by the communication system 100. The first control unit 212 can also execute the first software 226 for the other functions of the communication system 100, including receiving location information from the location unit 220. The first control unit 212 can further execute the first software 226 for interaction with the communication channel 112 of FIG. 1 via the first communication unit 216.

The first control unit 212 can be implemented in a number of different manners. For example, the first control unit 212 can be a processor, an embedded processor, a microprocessor, a hardware control logic, a hardware finite state machine, a digital signal processor, or a combination thereof.

The first control unit 212 can include the first control interface 222. The first control interface 222 can be used for communication between the first control unit 212 and other functional units in the designated mobile station 102. The first control interface 222 can also be used for communication that is external to the designated mobile station 102.

The first control interface 222 can receive information from the other functional units or from external sources, or can transmit information to the other functional units or to external destinations. The external sources and the external destinations refer to sources and destinations external to the designated mobile station 102.

The first control interface 222 can be implemented in different ways and can include different implementations depending on which functional units or external units are being interfaced with the first control interface 222. For example, the first control interface 222 can be implemented with a pressure sensor, an inertial sensor, a microelectromechanical system, optical circuitry, waveguides, wireless circuitry, wireline circuitry, or a combination thereof.

The first storage unit 214 can store the first software 226. The first storage unit 214 can also store the relevant information, such as advertisements, points of interest, navigation routing entries, or any combination thereof.

The first storage unit 214 can be a volatile memory, a nonvolatile memory, an internal memory, an external memory, or a combination thereof. For example, the first storage unit 214 can be a nonvolatile storage such as non-volatile random access memory, Flash memory, disk storage, or a volatile storage such as static random access memory.

The first storage unit 214 can include the first storage interface 224. The first storage interface 224 can be used for communication between the location unit 220 and other functional units in the designated mobile station 102. The first storage interface 224 can also be used for communication that is external to the designated mobile station 102.

The first storage interface 224 can receive information from the other functional units or from external sources, or can transmit information to the other functional units or to external destinations. The external sources and the external destinations refer to sources and destinations external to the designated mobile station 102.

The first storage interface 224 can include different implementations depending on which functional units or external units are being interfaced with the first storage unit 214. The first storage interface 224 can be implemented with technologies and techniques similar to the implementation of the first control interface 222.

The first communication unit 216 can enable external communication to and from the designated mobile station 102. For example, the first communication unit 216 can permit the designated mobile station 102 to communicate with the network base station 106, an attachment, such as a peripheral device or a computer desktop, and the communication channel 112.

The first communication unit 216 can also function as a communication hub allowing the designated mobile station 102 to function as part of the communication channel 112 and not limited to be an end point or terminal unit to the communication channel 112. The first communication unit 216 can include active and passive components, such as microelectronics or an antenna, for interaction with the communication channel 112.

The first communication unit 216 can include a first communication interface 228. The first communication interface 228 can be used for communication between the first communication unit 216 and other functional units in the designated mobile station 102. The first communication interface 228 can receive information from the other functional units or can transmit information to the other functional units.

The first communication interface 228 can include different implementations depending on which functional units are being interfaced with the first communication unit 216. The first communication interface 228 can be implemented with technologies and techniques similar to the implementation of the first control interface 222.

The first user interface 218 allows a user to interface and interact with the designated mobile station 102. The first user interface 218 can include an input device and an output device. Examples of the input device of the first user interface 218 can include a keypad, a touchpad, soft-keys, a keyboard, a microphone, or any combination thereof to provide data and communication inputs.

The first user interface 218 can include a first display interface 230. Examples of the output device of the first user interface 218 can include the first display interface 230. The first display interface 230 can include a display, a projector, a video screen, a speaker, or any combination thereof.

The location unit 220 can generate location information, current heading, current acceleration, and current speed of the designated mobile station 102, as examples. The location unit 220 can be implemented in many ways. For example, the location unit 220 can function as at least a part of GPS, an inertial navigation system, a cellular-tower location system, a pressure location system, or any combination thereof. Also, for example, the location unit 220 can utilize components such as an accelerometer or GPS receiver.

The location unit 220 can include a location interface 232. The location interface 232 can be used for communication between the location unit 220 and other functional units in the designated mobile station 102. The location interface 232 can also be used for communication that is external to the designated mobile station 102.

The location interface 232 can receive information from the other functional units or from external sources, or can transmit information to the other functional units or to external destinations. The external sources and the external destinations refer to sources and destinations external to the designated mobile station 102.

The location interface 232 can include different implementations depending on which functional units or external units are being interfaced with the location unit 220. The location interface 232 can be implemented with technologies and techniques similar to the implementation of the first control unit 212.

For illustrative purposes, the designated mobile station 102 is shown with the partition having the first control unit 212, the first storage unit 214, the first user interface 218, the first communication unit 216, and the location unit 220 although it is understood that the communication system 100 can have a different partition. For example, the first software 226 can be partitioned differently such that some or all of its function can be in the first control unit 212, the location unit 220, and the first communication unit 216. Also, the designated mobile station 102 can include other functional units not shown in FIG. 2 for clarity.

The functional units in the designated mobile station 102 can work individually and independently of the other functional units. The designated mobile station 102 can work individually and independently from the network base station 106 and the communication channel 112.

The network base station 106 can be optimized for implementing the present invention in a multiple device embodiment with the designated mobile station 102. The network base station 106 can provide the additional or higher performance processing power compared to the designated mobile station 102. The network base station 106 can include a second control unit 234, a second communication unit 236, and a second user interface 238.

The second user interface 238 allows a user to interface and interact with the network base station 106. The second user interface 238 can include an input device and an output device. Examples of the input device of the second user interface 238 can include a keypad, a touchpad, soft-keys, a keyboard, a microphone, or any combination thereof to provide data and communication inputs. Examples of the output device of the second user interface 238 can include a second display interface 240. The second display interface 240 can include a display, a projector, a video screen, a speaker, or any combination thereof.

The second control unit 234 can execute a second software 242 to provide the intelligence of the network base station 106 of the communication system 100. The second software 242 can operate in conjunction with the first software 226. The second control unit 234 can provide additional performance compared to the first control unit 212.

The second control unit 234 can operate the second user interface 238 to display information. The second control unit 234 can also execute the second software 242 for the other functions of the communication system 100, including operating the second communication unit 236 to communicate with the designated mobile station 102 over the communication channel 112.

The second control unit 234 can be implemented in a number of different manners. For example, the second control unit 234 can be a processor, an embedded processor, a microprocessor, a hardware control logic, a hardware finite state machine, a digital signal processor, or a combination thereof.

The second control unit 234 can include a second controller interface 244. The second controller interface 244 can be used for communication between the second control unit 234 and other functional units in the network base station 106. The second controller interface 244 can also be used for communication that is external to the network base station 106.

The second controller interface 244 can receive information from the other functional units or from external sources, or can transmit information to the other functional units or to external destinations. The external sources and the external destinations refer to sources and destinations external to the network base station 106.

The second controller interface 244 can be implemented in different ways and can include different implementations depending on which functional units or external units are being interfaced with the second controller interface 244. For example, the second controller interface 244 can be implemented with a pressure sensor, an inertial sensor, a microelectromechanical system, optical circuitry, waveguides, wireless circuitry, wireline circuitry, or a combination thereof.

A second storage unit 246 can store the second software 242. The second storage unit 246 can also store the relevant information, such as phone numbers, identification information, information for multiple access, such as code, frequency, or time slot, advertisements, points of interest, navigation routing entries, or any combination thereof. The second storage unit 246 can be sized to provide the additional storage capacity to supplement the first storage unit 214.

For illustrative purposes, the second storage unit 246 is shown as a single element, although it is understood that the second storage unit 246 can be a distribution of storage elements. Also for illustrative purposes, the communication system 100 is shown with the second storage unit 246 as a single hierarchy storage system, although it is understood that the communication system 100 can have the second storage unit 246 in a different configuration. For example, the second storage unit 246 can be formed with different storage technologies forming a memory hierarchal system including different levels of caching, main memory, rotating media, or off-line storage.

The second storage unit 246 can be a volatile memory, a nonvolatile memory, an internal memory, an external memory, or a combination thereof. For example, the second storage unit 246 can be a nonvolatile storage such as nonvolatile random access memory, Flash memory, disk storage, or a volatile storage such as static random access memory.

The second storage unit 246 can include a second storage interface 248. The second storage interface 248 can be used for communication between the location unit 220 and other functional units in the network base station 106. The second storage interface 248 can also be used for communication that is external to the network base station 106.

The second storage interface 248 can receive information from the other functional units or from external sources, or can transmit information to the other functional units or to external destinations. The external sources and the external destinations refer to sources and destinations external to the network base station 106.

The second storage interface 248 can include different implementations depending on which functional units or external units are being interfaced with the second storage unit 246. The second storage interface 248 can be implemented with technologies and techniques similar to the implementation of the second controller interface 244.

The second communication unit 236 can enable external communication to and from the network base station 106. For example, the second communication unit 236 can permit the network base station 106 to communicate with the designated mobile station 102 over the communication channel 112.

The second communication unit 236 can also function as a communication hub allowing the network base station 106 to function as part of the communication channel 112 and not limited to be an end point or terminal unit to the communication channel 112. The second communication unit 236 can include active and passive components, such as microelectronics or an antenna, for interaction with the communication channel 112.

The second communication unit 236 can include a second communication interface 250. The second communication interface 250 can be used for communication between the second communication unit 236 and other functional units in the network base station 106. The second communication interface 250 can receive information from the other functional units or can transmit information to the other functional units.

The second communication interface 250 can include different implementations depending on which functional units are being interfaced with the second communication unit 236. The second communication interface 250 can be implemented with technologies and techniques similar to the implementation of the second controller interface 244.

The first communication unit 216 can couple with the communication channel 112 to send information to the network base station 106 in the mobile transmission 208. The network base station 106 can receive information in the second communication unit 236 from the mobile transmission 208 of the communication channel 112.

The second communication unit 236 can couple with the communication channel 112 to send information to the designated mobile station 102 in the station transmission 210. The designated mobile station 102 can receive information in the first communication unit 216 from the station transmission 210 of the communication channel 112. The communication system 100 can be executed by the first control unit 212, the second control unit 234, or a combination thereof.

For illustrative purposes, the network base station 106 is shown with the partition having the second user interface 238, the second storage unit 246, the second control unit 234, and the second communication unit 236, although it is understood that the network base station 106 can have a different partition. For example, the second software 242 can be partitioned differently such that some or all of its function can be in the second control unit 234 and the second communication unit 236. Also, the network base station 106 can include other functional units not shown in FIG. 2 for clarity.

The functional units in the network base station 106 can work individually and independently of the other functional units. The network base station 106 can work individually and independently from the designated mobile station 102 and the communication channel 112.

For illustrative purposes, the communication system 100 is described by operation of the designated mobile station 102 and the network base station 106. It is understood that the designated mobile station 102 and the network base station 106 can operate any of the modules and functions of the communication system 100. For example, the designated mobile station 102 is described to operate the location unit 220, although it is understood that the network base station 106 can also operate the location unit 220.

Figure 3:
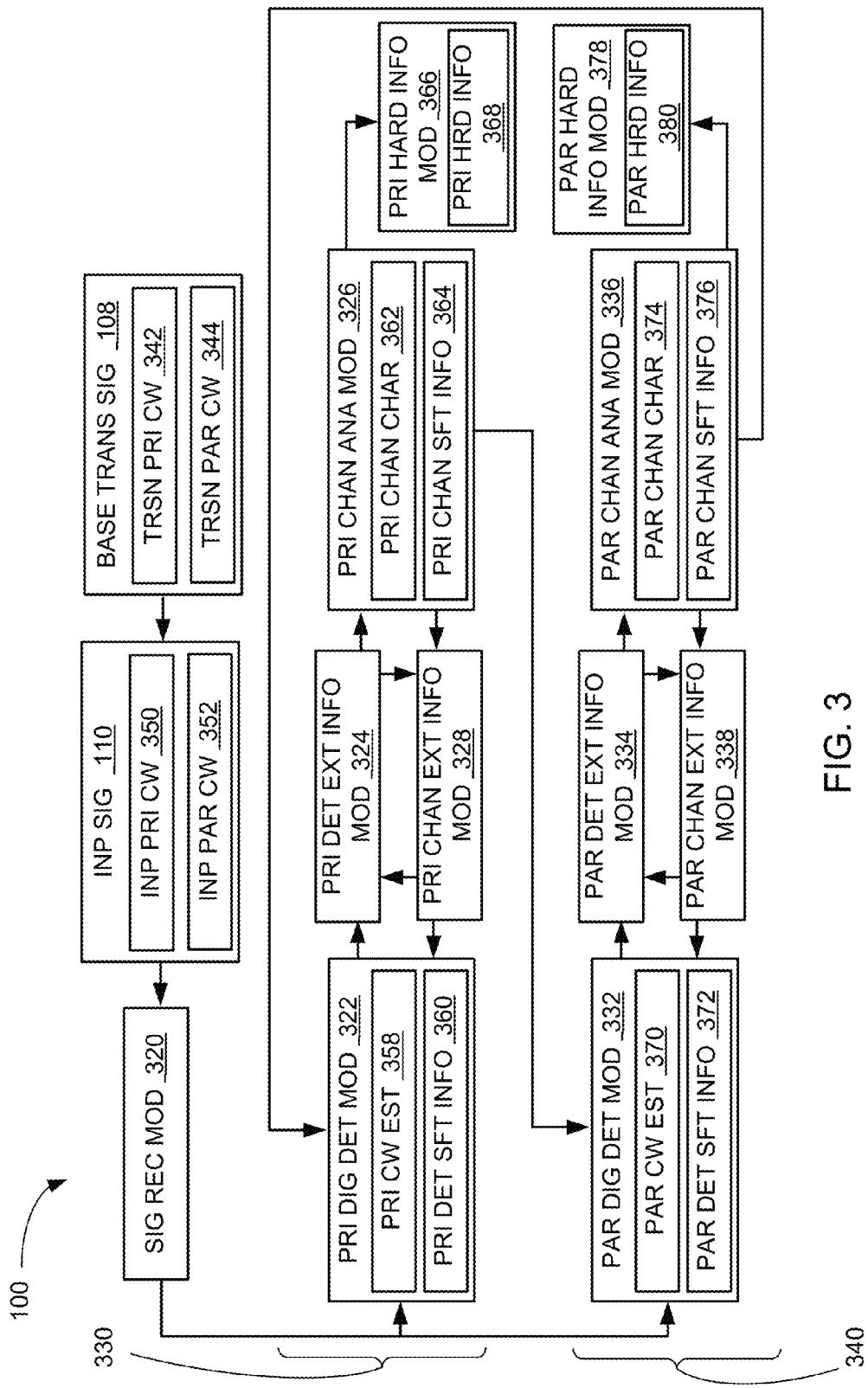
FIG. 3 is a control flow of the communication system.

Referring now to FIG. 3, therein is shown a control flow of the communication system 100. The communication system 100 can include a signal receiver module 320, a primary digital detection module 322, a primary detector external information module 324, a primary channel analysis module 326, and a primary channel external information module 328. The primary digital detection module 322, the primary detector external information module 324, the primary channel analysis module 326, and the primary channel external information module 328 can form a primary iterative feedback path 330.

The primary iterative feedback path 330, such as an iterative detection and decoding (IDD) path, can be for detecting and decoding a codeword or symbol in the input signal 110. For example, information generated by the primary digital detection module 322 can be passed through the primary detector external information module 324 to the primary channel analysis module 326. The information generated in the primary channel analysis module 326 can be passed through the primary channel external information module 328 back to the primary digital detection module 322 for further calculations.

Similarly, the communication system 100 can include a parallel digital detection module 332, a parallel detector external information module 334, a parallel channel analysis module 336, and a parallel channel external information module 338. The parallel digital detection module 332, the parallel detector external information module 334, the parallel channel analysis module 336, and the parallel channel external information module 338 can form a parallel iterative feedback path 340.

The parallel iterative feedback path 340, such as an iterative detection and decoding (IDD), can be for detecting and decoding a codeword or symbol in the input signal 110 different from the codeword or symbol detected and decoded in the primary iterative feedback path 330. For example, information generated by the parallel digital detection module 332 can be passed through the parallel detector external information module 334 to the parallel channel analysis module 336. The information generated in the parallel channel analysis module 336 can be passed through the parallel channel external information module 338 back to the parallel digital detection module 332 for further calculations.

The information generated in the primary iterative feedback path 330 and the parallel iterative feedback path 340 can be mutually shared. For example, the information generated by the parallel channel analysis module 336 can be passed to the primary digital detection module 322 as a-priori information for simultaneous or joint processing. Similarly, the information generated by the primary channel analysis module 326 can be passed to the parallel digital detection module 332 as a-priori information for simultaneous or joint processing. The simultaneous or joint processing can include joint or simultaneous detection and decoding of codewords or symbols within a signal, such as the input signal 110.

It has been discovered that information shared or passed between the primary iterative feedback path 330 and the parallel iterative feedback path 340 provides improved detection and decoding of codewords by reducing or minimizing the loss of information, such as information lost layer-separation detection.

The signal receiver module 320 is for receiving the transmitted signal from a base station. The signal receiver module 320 can receive the base transmission signal 108 that has propagated through the communication channel 112 as the input signal 110.

The base transmission signal 108 can include a transmitted primary codeword 342 and a transmitted parallel codeword 344. The transmitted primary codeword 342 and the transmitted parallel codeword 344 are defined as reference symbols or codewords at point of transmission. For example, the transmitted primary codeword 342 and the transmitted parallel codeword 344 can be the symbols or codewords of the base transmission signal 108 prior to propagation through the communication channel 112. The transmitted primary codeword 342 and the transmitted parallel codeword 344 can be reference symbols or codewords known according to accepted standards or protocols.

The input signal 110 can include an input primary codeword 350 and an input parallel codeword 352. The input primary codeword 350 and the input parallel codeword 352 are defined as reference symbols or codewords that have been affected by propagation through the channel. For example, the input primary codeword 350 can be the transmitted primary codeword 342 received by the designated mobile station 102 following propagation through the communication channel 112. Similarly, the input parallel codeword 352 can be the transmitted parallel codeword 344 received by the designated mobile station 102 following propagation through the communication channel 112.

For illustrative purposes, the communication system 100 is shown with the base transmission signal 108 having two codewords, the transmitted primary codeword 342 and the transmitted parallel codeword 344. However, it is understood that the base transmission signal 108 can include more than two codewords.

For further illustrative purposes, the communication system 100 is shown with the Signal receiver module 320 receiving the input signal 110 having two codewords, the input primary codeword 350 and the input parallel codeword 352. However, it is understood that the input signal 110 can include more than two codewords.

The Signal receiver module 320 can pass the input signal 110 to the primary digital detection module 322 and the parallel digital detection module 332.

The primary digital detection module 322 is for detecting and calculating soft information for an initial codeword for an initial iteration, cancelling interference due to other codewords, filtering residual noise and interference, and detecting the soft information representing the codeword on subsequent iterations. Each of these functions will be discussed in detail below.

The primary digital detection module 322 can output a primary codeword estimation 358 and a primary detected soft information 360. The primary codeword estimation 358 can be the estimation of the transmitted primary codeword 342 based on the input primary codeword 350.

The primary detected soft information 360 is defined as a representation of the symbol or codeword associated with a codeword detection process. For example, the primary detected soft information 360 can be the representation of the primary codeword estimation 358. The primary detected soft information 360 can be expressed as a log-likelihood ratio (LLR) for the bits of the primary codeword estimation 358. The primary detected soft information 360 can be a-posterior information when output by the primary digital detection module 322.

The primary digital detection module 322 can be stored in the first software 226 of FIG. 2. The primary digital detection module 322 can be executed by the first control unit 212 of FIG. 2.

The primary detector external information module 324 is for removing dependency of channel decoded information from the output of a symbol or codeword detection method or process. The primary detector external information module 324 can convert the primary detected soft information 360 of the primary codeword estimation 358 from a-posteriori information to extrinsic information by removing the portions of the primary detected soft information 360 associated with the output of the primary channel analysis module 326. For example, the primary detector external information module 324 can convert the primary detected soft information 360 to external information according to equation 1 as follows:

$$L_{n,m}^{(ext,1)} = L_{n,m}^{(A,1)} - L_{n,m}^{(a,1)}$$ (Equation 1)

The primary detected soft information 360 as external information can be expressed as "$L_{n,m}^{(ext,1)}$" where "n" refers generically to the "$n^{th}$" bit of the "$m^{th}$" codeword in a signal and the superscript "1" is a reference for association with a detection process. The primary detected soft information 360 as a-posteriori information from the primary digital detection module 322 can be expressed as "$L_{n,m}^{(A,1)}$" where the superscript "A" is a designation for a-posteriori. The soft information associated with the output of the primary channel analysis module 326 can be expressed as "$L_{n,m}^{(a,1)}$".

The primary detector external information module 324 can convert the primary detected soft information 360 from extrinsic information to a-priori information for the primary channel analysis module 326. As an example, the primary detector external information module 324 can de-interleave the primary detected soft information 360 for conversion to a-priori information according to equation 2 as follows:

$$L_{n,m}^{(a,2)} = \Pi^{-1} L_{n,m}^{(ext,1)}$$ (Equation 2)

The primary detected soft information 360 converted to a-priori information can be expressed as "$L_{n,m}^{(a,2)}$" where the superscript "2" is a reference for association with a decoding process. Following de-interleaving, the primary detected soft information 360 can be stored in the first storage unit 214 of FIG. 2 for further processing by the primary channel external information module 328.

As an example, the primary detector external information module 324 can be stored in the first software 226. The primary detector external information module 324 can be executed by the first control unit 212. The soft information associated with the output of the primary channel analysis module 326 can be stored in the first storage unit 214 of FIG. 2 and retrieved by the primary detector external information module 324 through the first storage interface 224.

The primary channel analysis module 326 is for characterizing the behavior of a signal travelling through the channel between the base station and the mobile station. For example, the process of characterizing can include measuring or analyzing noise and interference due to the behavior of the medium, such as reflection and loss caused by wires or refractions and obstructions in wireless environments. The primary channel analysis module 326 can analyze the communication channel 112 of FIG. 1 between the network base station 106 and the designated mobile station 102.

The primary channel analysis module 326 can analyze the transmitted primary codeword 342 to calculate a primary channel characterization 362. The primary channel characterization 362 is defined as a characterization of the channel between the base station and a mobile station.

The primary channel analysis module 326 can calculate the primary channel characterization 362 by analyzing the input primary codeword 350, the primary codeword estimation 358, or a combination thereof. For example, the primary channel analysis module 326 can calculate the primary channel characterization 362 based on the difference of signal characteristics, such as amplitude, phase, frequency, signal shape, power, or a combination thereof, between the primary codeword estimation 358 and the transmitted primary codeword 342.

As a further example, the primary channel analysis module 326 can calculate the primary channel characterization 362 by selecting a model for the communication channel 112 according to the signal distortion 118 of FIG. 1: The communication system 100 can have a selection of models for the communication channel 112, such as urban city or flat fading. The models and the corresponding values of the primary channel characterization 362 can be predetermined by the communication system 100, the hardware manufacturer, the software manufacturer, the user, accepted standards or protocols, or a combination thereof.

The primary channel analysis module 326 can use the first communication unit 216 of FIG. 2, the first control unit 212 of FIG. 2, or a combination thereof to calculate the primary channel characterization 362. The primary channel analysis module 326 can store the results of the characterization in the first storage unit 214. As an example, the primary channel analysis module 326 can operate based on turbo decoding scheme.

The primary channel analysis module 326 can recalculate or adjust the primary codeword estimation 358 based on the analysis of the communication channel 112. The primary channel analysis module 326 can calculate a primary channel soft information 364 as a representation of the recalculation or adjustment of the primary codeword estimation 358. The primary channel soft information 364 is defined as the soft information, representing the codeword or symbol, calculated with knowledge of the channel.

The primary channel soft information 364 can be expressed as an LLR value. As an example, the primary channel analysis module 326 can calculate the primary channel soft information 364 according to equation 3, as follows:

$$L_{n,m}^{(\cdot)} = \log \frac{P(c_{n,m} = +1 \mid y)}{P(c_{n,m} = -1 \mid y)} \quad \text{(Equation 3)}$$

The LLR expression of the primary channel soft information 364 for a particular bit "m" and a particular codeword "n" can be represented as "$L_{n,m}^{(\cdot)}$", where the superscript parenthetical can be for representing a-priori, a posteriori, or external notation. The coded "$m^{th}$" bit of the "$n^{th}$" codeword can be represented as "$c_{n,m}$". The LLR for the coded bits can be calculated given the input signal 110 "y". The primary channel soft information 364 can be the a-posteriori information of the primary channel analysis module 326.

The primary channel analysis module 326 can pass the primary channel characterization 362 and the primary channel soft information 364 to the primary channel external information module 328 and the parallel digital detection module 332. The primary channel soft information 364 can be the a-priori soft information for the parallel digital detection module 332.

The primary channel external information module 328 is for removing dependency of detected codeword information from the output of a channel estimation method or process. The primary channel external information module 328 can convert the primary channel soft information 364 of the primary codeword estimation 358 from a-posteriori information to extrinsic information by removing the portions of the primary channel soft information 364 associated with the output of the primary digital detection module 322. For example, the primary channel external information module 328 can convert the primary channel soft information 364 to external information according to equation 4 as follows:

$$L_{n,m}^{(ext,2)} = L_{n,m}^{(A,2)} - L_{n,m}^{(a,2)} \quad \text{(Equation 4)}$$

The primary channel soft information 364 as external information can be expressed as "$L_{n,m}^{(ext,2)}$" where "n" refers generically to the "$n^{th}$" bit of the "$m^{th}$" codeword. The primary channel soft information 364 as a-posteriori information from the primary channel analysis module 326 can be expressed as "$L_{n,m}^{(A,2)}$". The soft information associated with the output of the primary digital detection module 322, such as the primary detected soft information 360, can be expressed as "$L_{n,m}^{(a,2)}$". The primary channel external information module 328 can retrieve the primary detected soft information 360, stored as a-priori information for the primary channel analysis module 326, from the first storage unit 214.

The primary channel external information module 328 can convert the primary channel soft information 364 from external information to a-priori information for the primary digital detection module 322. As an example, the primary channel external information module 328 can interleave the primary channel soft information 364 for conversion to a-priori information according to equation 5 as follows:

$$L_{n,m}^{(a,1)} = \Pi L_{n,m}^{(ext,2)} \quad \text{(Equation 5)}$$

The primary channel soft information 364 as a-priori information can be expressed as "$L_{n,m}^{(a,1)}$". The primary channel soft information 364 following interleaving can also be stored in the first storage unit 214 for further processing by the primary detector external information module 324.

As an example, the primary channel external information module 328 can be stored in the first software 226. As a further example, the primary channel external information module 328 can be executed by the first control unit 212.

The communication system 100 can include a primary hard information module 366, coupled to the primary iterative feedback path 330. The primary hard information module 366 is for generating hard information representing a codeword or symbol based on soft information. For example, when the primary codeword estimation 358 matches the transmitted primary codeword 342, the primary hard information module 366 can generate primary hard information 368 based on the primary channel soft information 364, the primary detected soft information 360, or a combination thereof.

The parallel digital detection module 332 is for detecting and calculating soft information for an initial codeword for an initial iteration, cancelling interference due to other codewords, filtering residual noise and interference, and detecting the soft information representing the codeword on subsequent iterations. Each of these functions will be discussed in detail below.

The parallel digital detection module 332 can output a parallel codeword estimation 370 and a parallel detected soft information 372. The parallel codeword estimation 370 can be the estimation of the transmitted parallel codeword 344 based on the input parallel codeword 352.

The parallel detected soft information 372 is defined as a representation of the symbol or codeword associated with a codeword detection process. For example, the parallel detected soft information 372 can be the representation of the parallel codeword estimation 370. The parallel detected soft information 372 can be expressed as a log-likelihood ratio (LLR) for the bits of the parallel codeword estimation 370. The parallel detected soft information 372 can be a-posterior information when output by the parallel digital detection module 332.

The parallel digital detection module 332 can be stored in the first software 226. The parallel digital detection module 332 can be executed by the first control unit 212.

The parallel detector external information module 334 is for removing dependency of channel decoded information from the output of a symbol or codeword detection method or process. The parallel detector external information module 334 can convert the parallel detected soft information 372 of the parallel codeword estimation 370 from a-posteriori information to extrinsic information by removing the portions of the parallel detected soft information 372 associated with the output of the parallel channel analysis module 336. For example, the parallel detector external information module 334 can convert the parallel detected soft information 372 to external information according to equation 6 as follows:

$$L_{n,m}^{(ext,1)} = L_{n,m}^{(A,1)} - L_{n,m}^{(a,1)} \quad \text{(Equation 6)}$$

The parallel detected soft information 372 as external information can be expressed as "$L_{n,m}^{(ext,1)}$" where "n" refers generically to the "$n^{th}$" bit of the "$m^{th}$" codeword in a signal and the superscript "1" is a reference for association with a detection process. The parallel detected soft information 372 as a-posteriori information from the parallel digital detector module 332 can be expressed as "$L_{n,m}^{(A,1)}$" where the superscript "A" is a designation for a-posteriori. The soft information associated with the output of the parallel channel analysis module 336 can be expressed as "$L_{n,m}^{(a,1)}$".

The parallel detector external information module 334 can convert the parallel detected soft information 372 from extrinsic information to a-priori information for the parallel channel analysis module 336. As an example, the parallel detector external information module 334 can de-interleave the parallel detected soft information 372 for conversion to a-priori information according to equation 7 as follows:

$$L_{n,m}^{(a,2)} = \Pi^{-1} L_{n,m}^{(ext,1)} \quad \text{(Equation 7)}$$

The parallel detected soft information 372 converted to a-priori information can be expressed as "$L_{n,m}^{(a,2)}$" where the superscript "2" is a reference for association with a decoding process. Following de-interleaving, the parallel detected soft information 372 can be stored in the first storage unit 214 of for further processing by the parallel channel external information module 338.

As an example, the parallel detector external information module 334 can be stored in the first software 226. The parallel detector external information module 334 can be executed by the first control unit 212. The soft information associated with the output of the parallel channel analysis module 336 can be stored in the first storage unit 214 and retrieved by the parallel detector external information module 334 through the first storage interface 224.

The parallel channel analysis module 336 is for characterizing the behavior of a signal travelling through the channel between the base station and the mobile station. The parallel channel analysis module 336 can analyze the communication channel 112 between the network base station 106 and the designated mobile station 102.

The parallel channel analysis module 336 can analyze the transmitted parallel codeword 344 to calculate a parallel channel characterization 374. For example, the process of characterizing can include measuring or analyzing noise and interference due to the behavior of the medium, such as reflection and loss caused by wires or refractions and obstructions in wireless environments. The parallel channel characterization 374 is defined as a characterization of the channel between the base station and a mobile station.

The parallel channel analysis module 336 can calculate the parallel channel characterization 374 by analyzing the input parallel codeword 352, the parallel codeword estimation 370, or a combination thereof. For example, the parallel channel analysis module 336 can calculate the parallel channel characterization 374 based on the difference of signal characteristics, such as amplitude, phase, frequency, signal shape, power, or a combination thereof, between the parallel codeword estimation 370 and the transmitted parallel codeword 344.

As a further example, the parallel channel analysis module 336 can calculate the parallel channel characterization 374 by selecting a model for the communication channel 112 according to the signal distortion 118. The communication system 100 can have a selection of models for the communication channel 112, such as urban city or flat fading. The models and the corresponding values of the parallel channel characterization 374 can be predetermined by the communication system 100, the hardware manufacturer, the software manufacturer, the user, accepted standards or protocols, or a combination thereof.

The parallel channel analysis module 336 can use the first communication unit 216, the first control unit 212, or a combination thereof to calculate the parallel channel characterization 374. The parallel channel analysis module 336 can store the results of the characterization in the first storage unit 214. As an example, the parallel channel analysis module 336 can operate based on turbo decoding scheme.

The parallel channel analysis module 336 can recalculate or adjust the parallel codeword estimation 370 based on the analysis of the communication channel 112. The parallel channel analysis module 336 can calculate a parallel channel soft information 376 as a representation of the recalculation or adjustment of the parallel codeword estimation 370. The parallel channel soft information 376 is defined as the soft information, representing the codeword or symbol, calculated with knowledge of the channel.

The parallel channel soft information 376 can be expressed as an LLR value. As an example, the parallel channel analysis module 336 can calculate the parallel channel soft information 376 according to equation 8, as follows:

$$L_{n,m}^{()} = \log \frac{P(c_{n,m} = +1 \mid y)}{P(c_{n,m} = -1 \mid y)} \quad \text{(Equation 8)}$$

The LLR expression of the parallel channel soft information 376 for a particular bit "m" and a particular codeword "n" can be represented as "$L_{n,m}^{()}$", where the superscript parenthetical can be for representing a-priori, a posteriori, or external notation. The coded "$m^{th}$" bit of the "$n^{th}$" codeword can be represented as "$c_{n,m}$". The LLR for the coded bits can be calculated given the input signal 110 "y". The parallel channel soft information 376 can be the a-posteriori information of the parallel channel analysis module 336.

The parallel channel analysis module 336 can pass the parallel channel characterization 374 and the parallel channel soft information 376 to the parallel channel external information module 338 and the primary digital detection module 322. The parallel channel soft information 376 can be the a-priori soft information for the primary digital detection module 322.

The parallel channel external information module 338 is for removing dependency of detected codeword information from the output of a channel estimation method or process. The parallel channel external information module 338 can convert the parallel channel soft information 376 of the parallel codeword estimation 370 from a-posteriori information to extrinsic information by removing the portions of the parallel channel soft information 376 associated with the output of the parallel digital detection module 332. For example, the parallel channel external information module 338 can convert the parallel channel soft information 376 to external information according to equation 9 as follows:

$$L_{n,m}^{(ext,2)} = L_{n,m}^{(A,2)} - L_{n,m}^{(a,2)}$$ (Equation 9)

The parallel channel soft information 376 as external information can be expressed as "$L_{n,m}^{(ext,2)}$" where "n" refers generically to the "$n^{th}$" bit of the "$m^{th}$" codeword. The parallel channel soft information 376 as a-posteriori information from the parallel channel analysis module 336 can be expressed as "$L_{n,m}^{(A,2)}$". The soft information associated with the output of the parallel digital detection module 332, such as the parallel detected soft information 372, can be expressed as "$L_{n,m}^{(a,2)}$". The parallel channel external information module 338 can retrieve the parallel detected soft information 372, stored as a-priori information for the parallel channel analysis module 336, from the first storage unit 214.

The parallel channel external information module 338 can convert the parallel channel soft information 376 from external information to a-priori information for the parallel digital detection module 332. As an example, the parallel channel external information module 338 can interleave the parallel channel soft information 376 for conversion to a-priori information according to equation 10 as follows:

$$L_{n,m}^{(a,1)} = \Pi L_{n,m}^{(ext,2)}$$ (Equation 10)

The parallel channel soft information 376 as a-priori information can be expressed as "$L_{n,m}^{(a,1)}$". The parallel channel soft information 376 following interleaving can also be stored in the first storage unit 214 for further processing by the parallel detector external information module 334.

As an example, the parallel channel external information module 338 can be stored in the first software 226. As a further example, the parallel channel external information module 338 can be executed by the first control unit 212.

The communication system 100 can include a parallel hard information module 378, coupled to the parallel iterative feedback path 340. The parallel hard information module 378 is for generating hard information representing a codeword or symbol based on soft information. For example, when the parallel codeword estimation 370 matches the input parallel codeword 252, the parallel hard information module 378 can generate parallel hard information 380 based on the parallel channel soft information 376, the parallel detected soft information 372, or a combination thereof.

It has been discovered that information, such as the primary channel soft information 364, the parallel channel soft information 376, or a combination thereof, shared or passed between the primary iterative feedback path 330 and the parallel iterative feedback path 340 reduces or minimizes the loss of information when detecting and decoding the input primary codeword 350, the input parallel codeword 352, or a combination thereof. The sharing of the primary channel soft information 384, the parallel channel soft information 376 enables joint detection of the input primary codeword 350 and the input parallel codeword 352, which reduces or minimizes the loss of information, such as information lost layer-separation detection.

The processed symbol or codeword, including the primary codeword estimation 358, the parallel codeword estimation 370 or a combination thereof, can be used to process the message or data coming from or through the network base station 106. For example, the methods described above can be used to synchronize the designated mobile station 102 and the network base station 106 or to further detect and decode message or data in the input signal 110. The primary codeword estimation 358, the parallel codeword estimation 370, or a combination thereof can be further processed and communicated to the user, which can be displayed or audibly conveyed for communication with the first user interface 218 of FIG. 2 a device, including the designated mobile station 102.

The communication system 100 can display the primary detected soft information 360, the primary channel soft information 364, the parallel detected soft information 372, the parallel channel soft information 376, or a combination thereof through the first user interface 218, the second user interface 238 of FIG. 2, or a combination thereof. The communication system 100 can display the primary detected soft information 360, the primary channel soft information 364, the parallel detected soft information 372, the parallel channel soft information 376, or a combination thereof for troubleshooting purposes or for adjusting settings.

The communication system 100 describes the module functions or order as an example. Each of the modules can operate individually and independently of the other modules.

Furthermore, data generated in one module can be used by another module without being directly coupled to each other. For example, the primary digital detection module 322 can pass the primary detected soft information 360 to the primary channel analysis module 326. As another example, the parallel digital detection module 332 can pass the parallel detected soft information 372 to the parallel channel analysis module 336.

It is understood that the various modules described above can be implemented as hardware in the first control unit 212, the second control unit 234, or a combination thereof, such as dedicated circuitry or programmed arrays. The different modules can also be implemented as separate hardware mechanism, circuit, or device (not illustrated) in the designated mobile station 102, the network base station 106, or a combination thereof.

The physical transformation of the signal distortion 118, such as the signal interference experienced by the waves of the communication signal, results in movement in the physical world, such as static noise on the phone call or displaying of erroneous or incomplete information. The movement in the physical world can be fed back to the communication system 100 to further operate the communication system 100. For example, changes in the signal distortion 118 can trigger a handover and have the designated mobile station 102 of FIG. 1 connect to a different one of the network base station 106.

Further, the physical transformation of the input signal 110, such as calculation of the primary hard information 368 based on the primary detected soft information 360 or the primary channel soft information 364 for communication through the designated mobile station 102, results in movement in the physical world, such as the user continuing a phone conversation. The movement in the physical world can be fed back to the communication system 100 to further operate the communication system 100.

Yet further, the physical transformation of the input primary codeword 350, such as calculation of the primary codeword estimation 358 for enabling decoding of signals in the input signal 102, results in movement in the physical world, such as the user receiving information from the network base station 106 for communication or navigation with the designated mobile station 102. The communication or navigation with the designated mobile station 102 results in movement in the physical world, such as the user moving in response to the communication or the navigation, which leads to the need for further calculation of the primary codeword estimation 358 and continued movement in the physical world.

Figure 4:
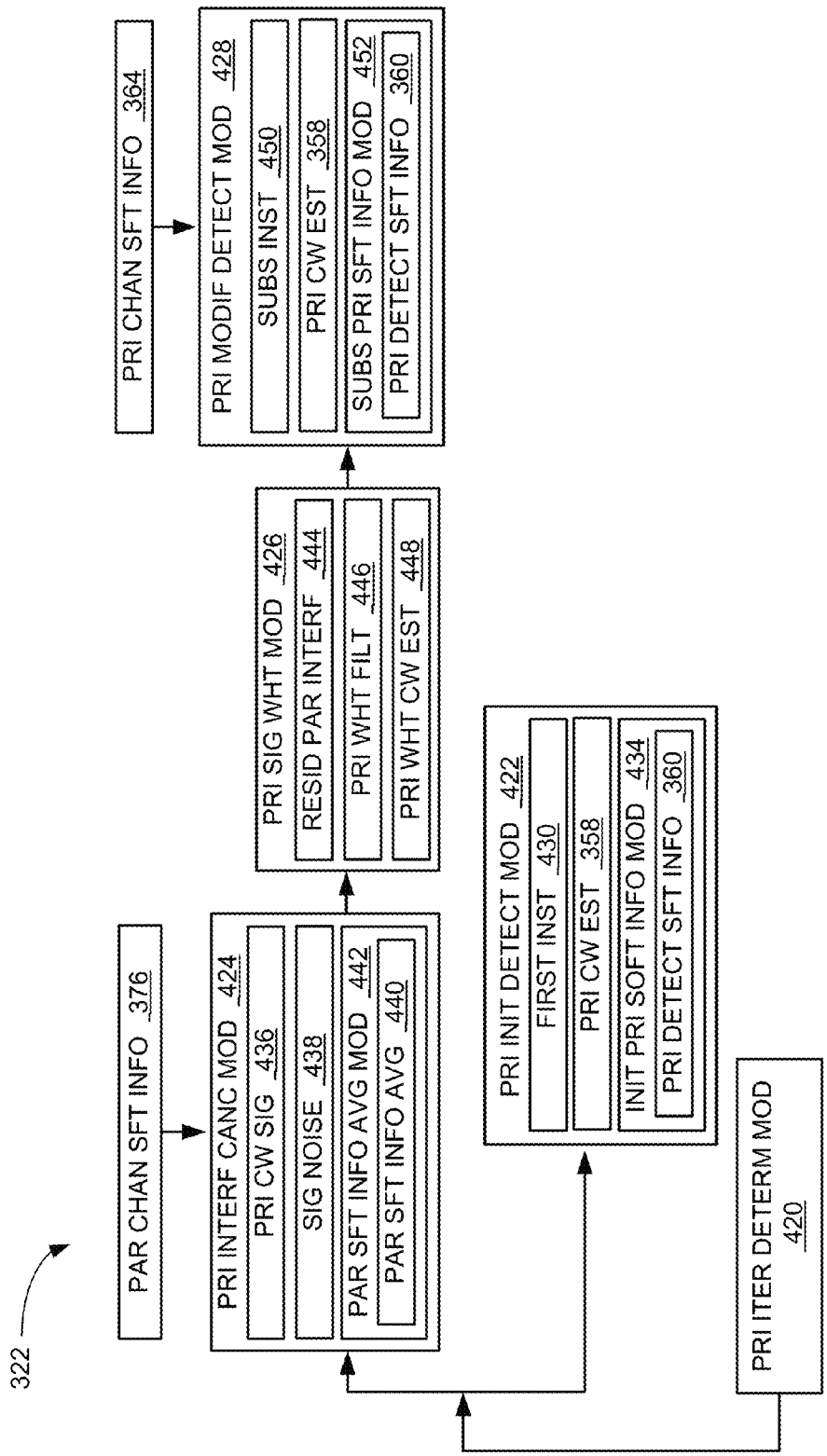
FIG. 4 is a view detailed of the primary digital detection module.

Referring now to FIG. 4, therein is shown a detailed view of the primary digital detection module 322. The primary digital detection module 322 can include a primary iteration determination module 420, a primary initial detection module 422, a primary interference cancellation module 424, a primary signal whitening module 426, and a primary modified detection module 428.

The primary iteration determination module 420, coupled to the primary digital detection module 322, is for determining whether the system is initially or subsequently detecting a reference codeword or symbol. The primary iteration determination module 420 can determine whether the primary digital detection module 322 is detecting the input primary codeword 350 in the input signal 110 of FIG. 1 for the first time or whether the primary digital detection module 322 is detecting the input primary codeword 350 based on one or more iterations.

As an example, the primary iteration determination module 420 can employ an iteration counter to track the number of iterations for detecting a particular one of the input primary codeword 350. For example, the primary iteration determination module 420 can set the iteration counter to 0 during initial power up, resets, handovers, based on other conditions, or a combination thereof and can increase the counter value for each subsequent iteration for detection of the input primary codeword 350.

When the primary iteration determination module 420 determines that the initial codeword detection has occurred, the primary digital detection module 322 can proceed with codeword detection with the primary interference cancellation module 424, the primary signal whitening module 426, the primary modified detection module 428, or a combination thereof.

The primary initial detection module 422, coupled to the primary iteration determination module 420, is for detecting the codeword from a signal. The primary initial detection module 422 can detect a first instance 430 of the primary codeword estimation 358. For example, the primary initial detection module 422 can detect the first instance 430 of the primary codeword estimation 358 by vary the sampling timing, frequency, modulation, or a combination thereof.

The primary initial detection module 422 can implement various methods to detect the first instance 430 of the primary codeword estimation 358. For example, the primary initial detection module 422 can use a maximum-likelihood (ML) detector or an interference cancelling detector. As a specific example, the primary initial detection module 422 can implement a 4×4 near optimal maximum likelihood estimation method.

As an example, the primary initial detection module 422 can detect the first instance 430 of the primary codeword estimation 358 by using the first control unit 212 of FIG. 2, first communication unit 216 of FIG. 2, or a combination thereof.

The primary initial detection module 422 can include an initial primary soft information module 434, coupled to the primary initial detection module 422. The initial primary soft information module 434 is for calculating soft information for a first instance detection of a codeword or symbol. The initial primary soft information module 434 can calculate the first instance 430 of the primary detected soft information 360 for the primary codeword estimation 358.

The primary detected soft information 360 is defined as soft information representing a detected codeword or symbol. The primary detected soft information 360 can be represented as a ratio of probabilities for bipolar bits, such as a log-likelihood ratio (LLR). As an example, the initial primary soft information module 434 can calculate the primary detected soft information 360 according to equation 11, as follows:

$$L_{n,m}^{(\cdot)} = \log \frac{P(c_{n,m}=+1|y)}{P(c_{n,m}=-1|y)} \quad \text{(Equation 11)}$$

The LLR expression of the primary detected soft information 360 for a particular bit "m" and a particular codeword "n" can be represented as "$L_{n,m}^{(\cdot)}$", where the superscript parenthetical can be for representing a-priori, a posteriori, or external notation. The coded "$m^{th}$" bit of the "$n^{th}$" codeword can be represented as "$c_{n,m}$". The probability of the coded bits can determined given the input signal 110 "y" of FIG. 1.

The primary detected soft information 360 expressed in equation 11 can be the a-posteriori information of the primary digital detection module 322. The initial primary soft information module 434 can calculate the primary detected soft information 360 without a-priori information for the input primary codeword 350.

The initial primary soft information module 434 can use the first control unit 212, the first communication unit 216, or a combination thereof to calculate the LLR for the primary detected soft information 360. The primary digital detection module 322 can output the primary detected soft information 360 for the first instance 430 of the primary codeword estimation 358.

The primary detected soft information 360 can be sent to the primary detector external information module 324 of FIG. 3 and the primary channel external information module 328 of FIG. 3 for further processing. The primary detected soft information 360 can be sent to the primary channel analysis module 326 as a-priori information.

The primary interference cancellation module 424, coupled to the primary iteration determination module 420, is for cancelling or filtering interference due to parallel signals, symbols, or codewords. The primary interference cancellation module 424 can generate a primary codeword signal 436 by filtering the interference due to the input parallel codeword 352 in the input signal 110.

The primary codeword signal 436 is defined as a signal having interference due to other codewords or symbols removed. As an example, the primary interference cancellation module 424 can calculate the primary codeword signal 436 by removing a parallel soft information average 440 of the input parallel codeword 352 of FIG. 3 from the input signal 110.

The parallel soft information average 440 is defined as an average of the probability distribution of binary bits for a parallel codeword or symbol. For example, the parallel soft information average 440 can be the soft estimates for averaged over the probability distribution of binary bits on the quadrature amplitude modulation (QAM) constellation space.

In general, the primary interference cancellation module 424 can calculate the primary codeword signal 436 according to the relationship expressed in equation 12, as follows:

$$y_{CW_i} = y - H s_{soft,CW_i}^{avg} \quad \text{(Equation 12)}$$

The primary codeword signal 436 can be represented as "$y_{CW_i}$". The input signal 110 can be represented as "y". An average of a soft estimate for the input primary codeword 350 can be represented as "$s_{soft,CW_i}^{avg}$".

A general representation of the channel characterization can be represented as "H". As a specific example, the channel characterization "H" can represent a channel matrix having dimensions corresponding to the number of layers in a signal. To continue the example, if the channel characterization represents a 4×4 channel matrix, the column vectors can represent the layers in the signal. For a signal having two codewords, such as the input primary codeword 350 and the input parallel codeword 352, the first two column vectors can be associated with one of the codewords and the second two column vectors can be associated with the other codeword. However, the number of layers associated with each of the codewords can change depending on the total number of layers or the number of codewords in the signal.

More specifically, for example, the primary interference cancellation module 424 can calculate the primary codeword signal 436 according to equation 13 as follows:

$$y_{CW_i} = H_{CW_i} s_{CW_i} + H_{CW_j}(s_{CW_j} - \bar{s}_{CW_j}^{(a,3)}) + n_{CW_i} \quad \text{(Equation 13)}$$

The primary codeword signal 436 can be represented as "$y_{CW_i}$" where the subscript "$CW_i$" is a reference to the input primary codeword 350. The primary channel characterization 362 of FIG. 3 can be represented as "$H_{CW_i}$" and the input primary codeword 350 can be represented by the variable "$s_{CW_i}$". The parallel channel characterization 374 can be represented by "$H_{CW_j}$" and the input parallel codeword 352 can be represented by "$s_{CW_j}$", where the subscript "CWj" is a reference to the input parallel codeword 352. The parallel soft information average 440 can be represented as "$\bar{s}_{CW_j}^{(a,3)}$". A signal noise 438 can be represented by the variable "$n_{CW_i}$". The signal noise 438 is defined as noise due to other signals, Gaussian white noise, or a combination thereof.

The primary interference cancellation module 424 can calculate the parallel soft information average 440 with a parallel soft information average module 442. The parallel soft information average module 442 is for calculating an expectation value for a symbol or codeword given the likelihood ratios for each bit for the symbol or codeword.

In general, the parallel soft information average 440 can be based on the expectation of a symbol or codeword given the soft information, expressed as an LLR value. As an example, the parallel soft information average 440 can be generally expressed by equation 14, as follows:

$$\bar{s}_k^{(\cdot)} = E[s_k | L_{k,1,M}^{(\cdot)}] \quad \text{(Equation 14)}$$

The parallel soft information average 440 can be represented by the "$\bar{s}_k^{(\cdot)}$" where the subscript "k" represents the index for a given codeword or symbol. The soft information for a given symbol or codeword can be represented by the variable "L", where the subscript "1:M" represents the number of bits for the given soft information.

As a further example, the parallel soft information average module 442 can calculate the parallel soft information average 440 based on the parallel channel soft information 376 according to equation 15 as follows:

$$\bar{s}_{SW_j}^{(a,3)} = \sum_{s \in C} s \prod_{m=1}^{M} \frac{1}{2}\left(1 + b_{CW_j,m} \tanh\left(\frac{L_{CW_j,m}^{(a,3)}}{2}\right)\right) \quad \text{(Equation 15)}$$

The value for the "$m^{th}$" bipolar bit for the parallel soft information average 440 can be represented by the variable "$b_{CW_j,m}$". The parallel channel soft information 376 of the input parallel codeword 352 can be represented as "$L_{CW_j,m}^{(a,3)}$".

As an example, the primary interference cancellation module 424 and the parallel soft information average module 442 can be stored in the first software 226. As a further example, the primary interference cancellation module 424 and the parallel soft information average module 442 can be executed by the first control unit 212. The primary codeword signal 436 can be passed to the primary signal whitening module 426.

The primary signal whitening module 426, coupled to the primary interference cancellation module 424, is for filtering residual interference and noise. The primary signal whitening module 426 can filter a residual parallel interference 444 in the primary codeword signal 436 due to the input parallel codeword 352 with a primary whitening filter 446. The residual parallel interference 444 is defined as signal noise, interference remaining after an interference cancellation process, or a combination thereof.

The primary whitening filter 446 is defined as a filter for removing noise and residual interference due to other codewords or symbols. The primary whitening filter 446 can be based on the channel characteristics derived from analysis of another codeword. For example, the primary whitening filter 446 can filter residual interference due to the input parallel codeword 352 of FIG. 3. As a further example, the primary whitening filter 446 can be based on the parallel channel characterization 374 of FIG. 3 according to equation 16 as follows:

$$w_{CW_i} = (H_{CW_j} Q_{CW_j} H_{CW_j}^t + \sigma^2 I_{n_r})^{-\frac{1}{2}} \quad \text{(Equation 16)}$$

The primary whitening filter 446 can be represented by "$w_{CW_i}$" where the subscript "CWi" denotes the transmitted primary codeword 342, the input primary codeword 350, or a combination thereof. The parallel channel characterization 374 can be represented by "$H_{CW_j}$" where the superscript "t" denotes the transpose. The Gaussian white noise can be represented by "σ". An identity function, such as an identity matrix having the dimensions "$n_r$" can be represented as "$I_{n_r}$".

The variable "$Q_{CW_j}$" can represent a derivation of the covariance for the input primary codeword 350, such as a covariance matrix. As a specific example, "$Q_{CW_j}$" can be a square matrix having the dimensions corresponding to the number of layers per codeword. For example, if there are two codewords and two layers for each codeword, the dimensions of "$Q_{CW_j}$" can be 2×2.

The primary signal whitening module 426 can apply the primary whitening filter 446 to the primary codeword signal 436, output from the primary interference cancellation module 424, to generate a primary whitened codeword estimation 448. The primary whitened codeword estimation 448 is defined as an estimate of a codeword of symbol derived from a signal having residual interference and noise removed.

As an example, the primary signal whitening module 426 can generate the primary whitened codeword estimation 448 can be calculated according to equation 17 as follows:

$$\hat{s}_{CW_i} = w_{CW_i}^t y_{CW_i} \quad \text{(Equation 17)}$$

The primary whitened codeword estimation 448 can be represented by "$\hat{s}_{CW_i}$". More specifically, for example, the primary codeword estimation 358 can be expressed by equation 18 as follows:

$$\hat{s}_{CW_i} = w_{CW_i}^t H_{CW_i} s_{CW_j} + w_{CW_i}^t h_{CW_j}(s_{CW_j} - \bar{s}_{CW_j}^{(a,3)}) + w_{CW_i}^t n_{CW_i} \quad \text{(Equation 18)}$$

Equation 18, above, can be rewritten in terms of the residual parallel interference 444, "$\eta_{CW_i}$", and a whitened channel characterization, "$\mu_{CW_i}$", according to equation 19 as follows:

$$\hat{s}_{CW_i} = \mu_{CW_i} y_{CW_i} + \eta_{CW_i} \quad \text{(Equation 19)}$$

The residual parallel interference 444, "$\eta_{CW_i}$", can be expressed based on equation 19 by equation 20, as follows:

$$\eta_{CW_i} = w_{CW_i}^t h_{CW_j}(s_{CW_j} - \bar{s}_{CW_j}^{(a,3)}) + w_{CW_i}^t n_{CW_i} \quad \text{(Equation 20)}$$

The whitened channel characterization, "$\mu_{CW_i}$" can be the primary channel characterization 362 modified by the primary whitening filter 446. As an example, the whitened channel characterization can be expressed by equation 21 as follows:

$$\mu_{CW_i} = w_{CW_i}^t H_{CW_i} \quad \text{(Equation 21)}$$

The primary modified detection module 428, coupled to the primary signal whitening module 426, is for detecting the codeword from a signal. The primary modified detection module 428 can detect a subsequent instance 450 of the primary codeword estimation 358. For example, the primary modified detection module 428 can detect the subsequent instance 450 of the primary codeword estimation 358 by vary the sampling timing, frequency, modulation, or a combination thereof of the input signal 110 and with a-priori information, such as the primary channel soft information 364 from the previous iteration. As a further example, the primary modified detection module 428 can detect the subsequent instance 450 of the primary codeword estimation 358 based on the primary whitened codeword estimation 448.

The primary modified detection module 428 can implement various methods to detect the subsequent instance 450 of the primary codeword estimation 358. For example, the primary modified detection module 428 can be a maximum-likelihood detector or an interference cancelling detector. As a specific example, the primary modified detection module 428 can implement a rank 2 or a 4×2 modified maximum likelihood (MML) estimation method.

The modified maximum likelihood method can be used to reduce the complexity for estimation of the primary detected soft information 360 based dimension reduction. For example, in a multiple input multiple output (MIMO) system, the MML method can reduce the number of layers for a given modulation order when estimating the primary detected soft information 360 for the primary codeword estimation 358, which reduces computational complexity.

The primary modified detection module 428 can detect the subsequent instance 450 of the primary codeword estimation 358 by using the first control unit 212, first communication unit 216, or a combination thereof.

The primary modified detection module 428 can include a subsequent primary soft information module 452, coupled to the primary modified detection module 428. The subsequent primary soft information module 452 is for calculating soft information for subsequent instances of detection of a codeword or symbol following one or more previous iterations for detection of the codeword or symbol.

The subsequent primary soft information module 452 can calculate the primary detected soft information 360 for the subsequent instance 450 of the primary codeword estimation 358 based on a-priori information and the primary whitened codeword estimation 448. For example, the a-priori information, such as LLR values, can be the output of the primary channel analysis module 326, the parallel channel analysis module 336, or a combination thereof.

The primary detected soft information 360 can be represented as an LLR based on the probability of coded bits given the input signal 110. As an example, the subsequent primary soft information module 452 can calculate the primary detected soft information 360 according to equation 22, as follows:

$$L_{n,m}^{(\cdot)} = \log \frac{P(c_{n,m} = +1 \mid y)}{P(c_{n,m} = -1 \mid y)} \quad \text{(Equation 22)}$$

The LLR expression of the primary detected soft information 360 for a particular bit "m" and a particular codeword "n" can be represented as "$L_{n,m}^{(\cdot)}$", where the superscript parenthetical can be for representing a-priori, a posteriori, or external notation. The coded bits the "$m^{th}$" bit and the "$n^{th}$" codeword can be represented as "$c_{n,m}$". As a specific example, equation 22 expresses the LLR of the primary detected soft information 360 as the a-posteriori information.

The subsequent primary soft information module 452 can use the first control unit 212, the first communication unit 216, or a combination thereof to calculate the LLR for the primary detected soft information 360. The primary digital detection module 322 can output the primary detected soft information 360 for the subsequent instance 450 of the primary codeword estimation 358.

The primary detected soft information 360 can be sent to the primary detector external information module 324 and the primary channel external information module 328 for further processing. The primary detected soft information 360 can be sent to the primary channel analysis module 326 as a-priori information.

It has been discovered that calculation of the first instance 430 of the primary detected soft information 360 for the primary codeword estimation 358 improves performance. The calculation of the first instance 430 of the primary detected soft information 360 based on a near-optimal maximum likelihood detection method provides improved performance by enabling accurate initial detection of the input primary codeword 350.

It has also been discovered that calculation of the first instance 430 of the primary detected soft information 360 for the primary codeword estimation 358 with the primary initial detection module 422 and the subsequent instance 450 of the primary detected soft information 360 with the primary modified detection module 428 reduces overall computational complexity. The primary modified detection module 428 reduces computational complexity by detecting the input primary codeword 350 based on a reduced rank maximum likelihood detection method.

It has further been discovered that detection of the input primary codeword 350 with the primary modified detection module 428 based on a reduced rank maximum likelihood detection method achieves consistent performance over all ranges of code rates.

It has yet further been discovered that interference cancellation based on the primary channel soft information 364 and the parallel channel soft information 376 in combination improves calculation of the primary codeword signal 436 and the primary detected soft information 360 by more complete and accurate noise and interference cancellation.

Figure 5:
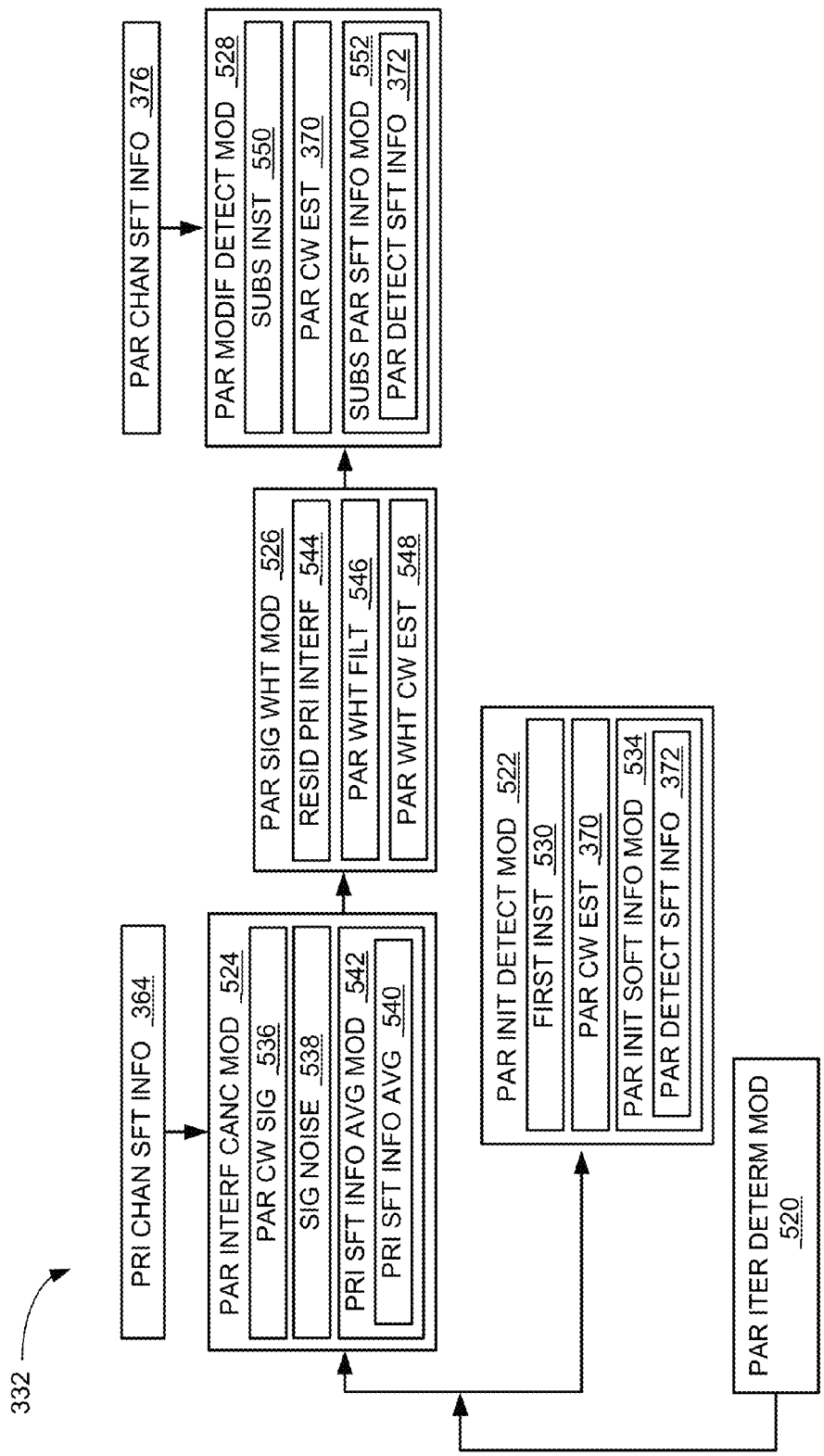
FIG. 5 is a view detailed of the parallel digital detection module.

Referring now to FIG. 5, therein is shown a view detailed of the parallel digital detection module 332. The parallel digital detection module 332 can include a parallel iteration determination module 520, a parallel initial detection module 522, a parallel interference cancellation module 524, a parallel signal whitening module 526, and a parallel modified detection module 528.

The parallel iteration determination module 520, coupled to the parallel digital detection module 332, is for determining whether the system is initially or subsequently detecting a reference codeword or symbol. The parallel iteration determination module 520 can determine whether the parallel digital detection module 332 is detecting the input parallel codeword 352 of FIG. 3 in the input signal 110 of FIG. 1 for the first time or whether the parallel digital detection module 332 is detecting the input parallel codeword 352 based on one or more iterations.

As an example, the parallel iteration determination module 520 can employ an iteration counter to track the number of iterations for detecting a particular one of the input parallel codeword 352. For example, the parallel iteration determination module 520 can set the iteration counter to 0 during initial power up, resets, handovers, based on other conditions, or a combination thereof and can increase the counter value for each subsequent iteration for detection of the input parallel codeword 352.

When the parallel iteration determination module 520 determines that the initial codeword detection has occurred, the parallel digital detection module 332 can proceed with codeword detection with the parallel interference cancellation module 524, the parallel signal whitening module 526, the parallel modified detection module 528, or a combination thereof.

The parallel initial detection module 522, coupled to the parallel iteration determination module 520, is for detecting the codeword from a signal. The parallel initial detection module 522 can detect a first instance 530 of the parallel codeword estimation 370. For example, the parallel initial detection module 522 can detect the first instance 530 of the parallel codeword estimation 370 by vary the sampling timing, frequency, modulation, or a combination thereof.

The parallel initial detection module 522 can implement various methods to detect the first instance 530 of the parallel codeword estimation 370. For example, the parallel initial detection module 522 can use a maximum-likelihood (ML) detector or an interference cancelling detector. As a specific example, the parallel initial detection module 522 can implement a 5×4 near optimal maximum likelihood estimation method.

As an example, the parallel initial detection module 522 can detect the first instance 530 of the parallel codeword estimation 370 by using the first control unit 212 of FIG. 2, first communication unit 216 of FIG. 2, or a combination thereof.

The parallel initial detection module 522 can include an initial parallel soft information module 534, coupled to the parallel initial detection module 522. The initial parallel soft information module 534 is for calculating soft information for a first instance detection of a codeword or symbol. The initial parallel soft information module 534 can calculate the first instance 530 of the parallel detected soft information 372 for the parallel codeword estimation 370.

The parallel detected soft information 372 is defined as soft information representing a detected codeword or symbol. The parallel detected soft information 372 can be represented as a ratio of probabilities for bipolar bits, such as a log-likelihood ratio (LLR). As an example, the initial parallel soft information module 534 can calculate the parallel detected soft information 372 according to equation 23, as follows:

$$L_{n,m}^{(\cdot)} = \log \frac{P(c_{n,m} = +1 \mid y)}{P(c_{n,m} = -1 \mid y)} \quad \text{(Equation 23)}$$

The LLR expression of the parallel detected soft information 372 for a particular bit "m" and a particular codeword "n" can be represented as "$L_{n,m}^{(\cdot)}$", where the superscript parenthetical can be for representing a-priori, a posteriori, or external notation. The coded "$m^{th}$" bit of the "$n^{th}$" codeword can be represented as "$c_{n,m}$". The probability of the coded bits can determined given the input signal 110 "y" of FIG. 1.

The parallel detected soft information 372 expressed in equation 23 can be the a-posteriori information of the parallel digital detection module 332. The initial parallel soft information module 534 can calculate the parallel detected soft information 372 without a-priori information for the input parallel codeword 352.

The initial parallel soft information module 534 can use the first control unit 212, the first communication unit 216, or a combination thereof to calculate the LLR for the parallel detected soft information 372. The parallel digital detection module 332 can output the parallel detected soft information 372 for the first instance 530 of the parallel codeword estimation 370.

The parallel detected soft information 372 can be sent to the parallel detector external information module 334 of FIG. 3 and the parallel channel external information module 338 of FIG. 3 for further processing. The parallel detected soft information 372 can be sent to the parallel channel analysis module 336 as a-priori information.

The parallel interference cancellation module 524, coupled to the parallel iteration determination module 520, is for cancelling or filtering interference due to primary signals, symbols, or codewords. The parallel interference cancellation module 524 can generate a parallel codeword signal 536 by filtering the interference due to the input primary codeword 350 of FIG. 3 in the input signal 110.

The parallel codeword signal 536 is defined as a signal having interference due to other codewords or symbols removed. As an example, the parallel interference cancellation module 524 can calculate the parallel codeword signal 536 by removing a primary soft information average 540 of the input primary codeword 350 from the input signal 110.

The primary soft information average 540 is defined as an average of the probability distribution of binary bits for a primary codeword or symbol. For example, the primary soft information average 540 can be the soft estimates for averaged over the probability distribution of binary bits on the quadrature amplitude modulation (QAM) constellation space.

In general, the parallel interference cancellation module 524 can calculate the parallel codeword signal 536 according to the relationship expressed in equation 24, as follows:

$$y_{CW_i} = y - Hs_{soft, CW_i}^{avg} \quad \text{(Equation 24)}$$

The parallel codeword signal 536 can be represented as "$y_{CWi}$". The input signal 110 can be represented as "y". An average of a soft estimate for the input parallel codeword 352 can be represented as "$s_{soft,CW_i}^{avg}$".

A general representation of the channel characterization can be represented as "H". As a specific example, the channel characterization "H" can represent a channel matrix having dimensions corresponding to the number of layers in a signal. To continue the example, if the channel characterization represents a 4×4 channel matrix, the column vectors can represent the layers in the signal. For a signal having two codewords, such as the input primary codeword 350 and the input parallel codeword 352, the first two column vectors can be associated with one of the codewords and the second two column vectors can be associated with the other codeword. However, the number of layers associated with each of the codewords can change depending on the total number of layers or the number of codewords in the signal.

More specifically, for example, the parallel interference cancellation module 524 can calculate the parallel codeword signal 536 according to equation 25 as follows:

$$y_{CW_i} = H_{CW_i} s_{CW_i} + H_{CW_j}(s_{CW_j} - \bar{s}_{CW_j}^{(a,3)}) + n_{CW_i} \quad \text{(Equation 25)}$$

The parallel codeword signal 536 can be represented as "$y_{CWi}$" where the subscript "$CW_i$" is a reference to the input parallel codeword 352. The parallel channel characterization 374 can be represented as "$H_{CWi}$" and the input parallel codeword 352 can be represented by the variable "$s_{CWi}$". The primary channel characterization 362 can be represented by "$H_{CWj}$" and the input primary codeword 350 can be represented by "$s_{CWj}$", where the subscript "CWj" is a reference to the input primary codeword 350. The primary soft information average 540 can be represented as "$\bar{s}_{CW_j}^{(a,3)}$". A signal noise 538 can be represented by the variable "$n_{CWi}$". The signal noise 538 is defined as noise due to other signals, Gaussian white noise, or a combination thereof.

The parallel interference cancellation module 524 can calculate the primary soft information average 540 with a primary soft information average module 542. The primary soft information average module 542 is for calculating an expectation value for a symbol or codeword given the likelihood ratios for each bit for the symbol or codeword.

In general, the primary soft information average 540 can be based on the expectation of a symbol or codeword given the soft information, expressed as an LLR value. As an example, the primary soft information average 540 can be generally expressed by equation 26, as follows:

$$\bar{s}_k^{(\cdot)} = E[s_k | L_{k,1:M}^{(\cdot)}] \quad \text{(Equation 26)}$$

The primary soft information average 540 can be represented by the "$\bar{s}_k^{(\cdot)}$" where the subscript "k" represents the index for a given codeword or symbol. The soft information for a given symbol or codeword can be represented by the variable "L", where the subscript "1:M" represents the number of bits for the given soft information.

As a further example, the primary soft information average module 542 can calculate the primary soft information average 540 based on the primary channel soft information 364 according to equation 27 as follows:

$$\bar{s}_{SW_j}^{(a,3)} = \sum_{s \in C} s \prod_{m=1}^{M} \frac{1}{2}\left(1 + b_{CW_j,m} \tanh\left(\frac{L_{CW_j,m}^{(a,3)}}{2}\right)\right) \quad \text{(Equation 27)}$$

The value for the "$m^{th}$" bipolar bit for the primary soft information average 540 can be represented by the variable "$b_{CWi,m}$". The primary channel soft information 364 of the input primary codeword 350 can be represented as "$L_{CW_j,m}^{(a,3)}$".

As an example, the parallel interference cancellation module 524 and the primary soft information average module 542 can be stored in the first software 226. As a further example, the parallel interference cancellation module 524 and the primary soft information average module 542 can be executed by the first control unit 212. The parallel codeword signal 536 can be passed to the parallel signal whitening module 526.

The parallel signal whitening module 526, coupled to the parallel interference cancellation module 524, is for filtering residual interference and noise. The parallel signal whitening module 526 can filter a residual primary interference 544 in the parallel codeword signal 536 due to the input primary codeword 350 with a parallel whitening filter 546. The residual primary interference 544 is defined as signal noise, interference remaining after an interference cancellation process, or a combination thereof.

The parallel whitening filter 546 is defined as a filter for removing noise and residual interference due to other codewords or symbols. The parallel whitening filter 546 can be based on the channel characteristics derived from analysis of another codeword. For example, the parallel whitening filter 546 can filter residual interference due to the input primary codeword. As a further example, the parallel whitening filter 546 can be based on the primary channel characterization 362 of FIG. 3 according to equation 28 as follows:

$$w_{CW_i} = \left(H_{CW_j} Q_{CW_j} H_{CW_j}^t + \sigma^2 I_{n_r}\right)^{-\frac{1}{2}} \quad \text{(Equation 28)}$$

The parallel whitening filter 546 can be represented by "$w_{CWi}$" where the subscript "CWi" denotes the transmitted parallel codeword 344, the input parallel codeword 352, or a combination thereof. The primary channel characterization 362 can be represented by "$H_{CWj}$" where the superscript "t" denotes the transpose. The Gaussian white noise can be represented by "$\sigma$". An identity function, such as an identity matrix having the dimensions "$n_r$" can be represented as "$I_{n_r}$".

The variable "$Q_{CWj}$" can represent a derivation of the covariance for the input parallel codeword 352, such as a covariance matrix. As a specific example, "$Q_{CWj}$" can be a square matrix having the dimensions corresponding to the number of layers per codeword. For example, if there are two codewords and two layers for each codeword, the dimensions of "$Q_{CWj}$" can be 2×2.

The parallel signal whitening module 526 can apply the parallel whitening filter 546 to the parallel codeword signal 536, output from the parallel interference cancellation module 524, to generate a parallel whitened codeword estimation 548. The parallel whitened codeword estimation 548 is defined as an estimate of a codeword of symbol derived from a signal having residual interference and noise removed.

As an example, the parallel signal whitening module 526 can generate the parallel whitened codeword estimation 548 can be calculated according to equation 29 as follows:

$$\hat{s}_{CW_i} = w_{CW_i}^t y_{CW_i} \quad \text{(Equation 29)}$$

The parallel whitened codeword estimation 548 can be represented by "$\hat{s}_{CW_i}$". More specifically, for example, the parallel codeword estimation 370 can be expressed by equation 30 as follows:

$$\hat{s}_{CW_i} = w_{CW_i}{}^t H_{CW_i} s_{CW_j} + w_{CW_i}{}^t h_{CW_j}(s_{CW_j} - \bar{s}_{CW_j}{}^{(a,3)}) + w_{CW_i}{}^t n_{CW_i} \quad \text{(Equation 30)}$$

Equation 30, above, can be rewritten in terms of the residual primary interference 544, "$\eta_{CW_i}$", a whitened channel characterization, "$\mu_{CW_i}$", according to equation 31 as follows:

$$\hat{s}_{CW_i} = \mu_{CW_i} y_{CW_i} + \eta_{CW_i} \quad \text{(Equation 31)}$$

The residual primary interference 544, "$\eta_{CW_i}$", can be expressed based on equation 31 by equation 32, as follows:

$$\eta_{CW_i} = w_{CW_i}{}^t h_{CW_j}(s_{CW_j} - \bar{s}_{CW_j}{}^{(a,3)}) + w_{CW_i}{}^t n_{CW_i} \quad \text{(Equation 32)}$$

The whitened channel characterization, "$\mu_{CW_i}$", can be the parallel channel characterization 374 modified by the parallel whitening filter 546. As an example, the whitened channel characterization can be expressed by equation 21 as follows:

$$\mu_{CW_i} = w_{CW_i}{}^t H_{CW_i} \quad \text{(Equation 33)}$$

The parallel modified detection module 528, coupled to the parallel signal whitening module 526, is for detecting the codeword from a signal. The parallel modified detection module 528 can detect a subsequent instance 550 of the parallel codeword estimation 370. For example, the parallel modified detection module 528 can detect the subsequent instance 550 of the parallel codeword estimation 370 by vary the sampling timing, frequency, modulation, or a combination thereof of the input signal 110 and with a-priori information, such as the parallel channel soft information 376 from the previous iteration. As a further example, the parallel modified detection module 528 can detect the subsequent instance 550 of the parallel codeword estimation 370 based on the parallel whitened codeword estimation 548.

The parallel modified detection module 528 can implement various methods to detect the subsequent instance 550 of the parallel codeword estimation 370. For example, the parallel modified detection module 528 can be a maximum-likelihood detector or an interference cancelling detector. As a specific example, the parallel modified detection module 528 can implement a rank 2 or a 4×2 modified maximum likelihood (MML) estimation method.

The modified maximum likelihood method can be used to reduce the complexity for estimation of the parallel detected soft information 372 based dimension reduction. For example, in a multiple input multiple output (MIMO) system, the MML method can reduce the number of layers for a given modulation order when estimating the parallel detected soft information 372 for the parallel codeword estimation 370, which reduces computational complexity.

The parallel modified detection module 528 can detect the subsequent instance 550 of the parallel codeword estimation 370 by using the first control unit 212, first communication unit 216, or a combination thereof.

The parallel modified detection module 528 can include a subsequent parallel soft information module 552, coupled to the parallel modified detection module 528. The subsequent parallel soft information module 552 is for calculating soft information for subsequent instances of detection of a codeword or symbol following one or more previous iterations for detection of the codeword or symbol.

The subsequent parallel soft information module 552 can calculate the parallel detected soft information 372 for the subsequent instance 550 of the parallel codeword estimation 370 based on a-priori information and the parallel whitened codeword estimation 548. For example, the a-priori information, such as LLR values, can be the output of the parallel channel analysis module 336, the primary channel analysis module 326, or a combination thereof.

The parallel detected soft information 372 can be represented as an LLR based on the probability of coded bits given the input signal 110. As an example, the subsequent parallel soft information module 552 can calculate the parallel detected soft information 372 according to equation 34, as follows:

$$L_{n,m}^{(\cdot)} = \log \frac{P(c_{n,m} = +1 \mid y)}{P(c_{n,m} = -1 \mid y)} \quad \text{(Equation 34)}$$

The LLR expression of the parallel detected soft information 372 for a particular bit "m" and a particular codeword "n" can be represented as "$L_{n,m}^{(\cdot)}$", where the superscript parenthetical can be for representing a-priori, a posteriori, or external notation. The coded bits the "$m^{th}$" bit and the "$n^{th}$" codeword can be represented as "$c_{n,m}$". As a specific example, equation 34 expresses the LLR of the parallel detected soft information 372 as the a-posteriori information.

The subsequent parallel soft information module 552 can use the first control unit 212, the first communication unit 216, or a combination thereof to calculate the LLR for the parallel detected soft information 372. The parallel digital detection module 332 can output the parallel detected soft information 372 for the subsequent instance 550 of the parallel codeword estimation 370.

The parallel detected soft information 372 can be sent to the parallel detector external information module 334 and the parallel channel external information module 338 for further processing. The parallel detected soft information 372 can be sent to the parallel channel analysis module 336 as a-priori information.

Figure 6:
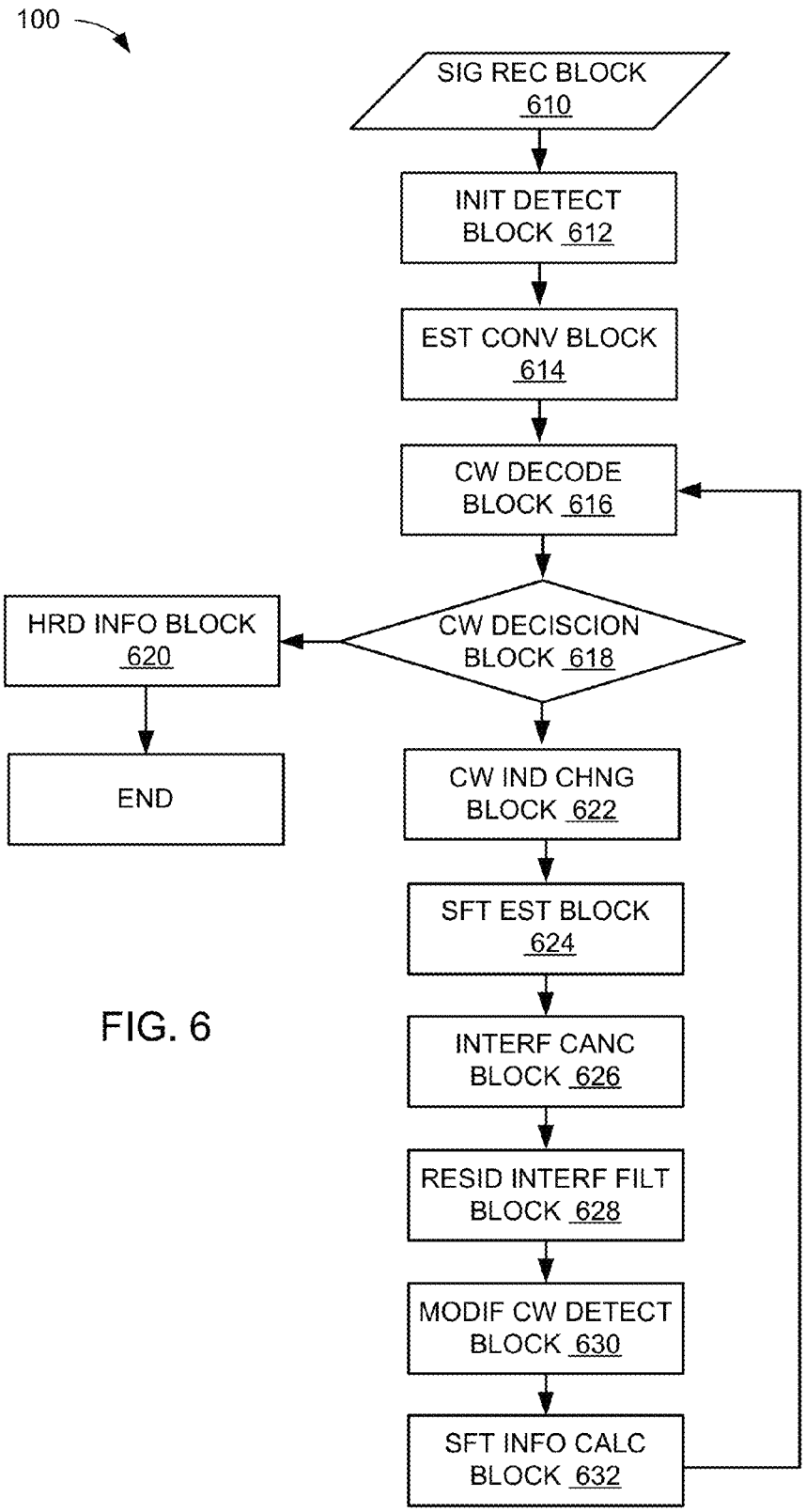
FIG. 6 is an exemplary process flow for the communication system.

Referring now to FIG. 6, therein is shown an exemplary process flow for the communication system 100. The communication system 100 can receive the input signal 110 of FIG. 3 in a Signal receiver block 610. The signal receiver block can implement the Signal receiver module 320 of FIG. 3. The Signal receiver block 610 can pass the input signal 110 to an initial detection block 612.

The communication system 100 can detect the input primary codeword 350 of FIG. 3 and the input parallel codeword 352 of FIG. 3 in the initial detection block 612. The initial detection block 612 can be coupled to the Signal receiver block 610. The initial detection block 612 can implement the primary digital detection module 322 of FIG. 3 and the parallel digital detection module 332 of FIG. 3. The initial detection block 612 can output the primary detected soft information 360 of the input primary codeword 350 of FIG. 3 and the parallel detected soft information 372 of the input parallel codeword 352 of FIG. 3.

The communication system 100 can include an estimate conversion block 614, coupled to the initial detection block 612. The estimate conversion block 614 can implement the primary detector external information module 324 of FIG. 3 and the parallel decoder external information module of FIG. 3. The estimate conversion block 614 can output the primary detected soft information 360 and the parallel detected soft information 372 as a-priori information for a codeword decoder block 616.

The codeword decoder block 616 can be coupled to the estimate conversion block 614. The codeword decoder block 616 can implement the primary channel analysis module 326 of FIG. 3 and the parallel channel analysis module 336. The codeword decoder block 616 can output the primary channel soft information 364 of FIG. 3 of the input primary codeword 350 and the parallel channel soft information 376 of FIG. 3 of the input parallel codeword 352.

The communication system 100 can include a codeword decision block 618. The codeword decision block 618 is for determining whether a received codeword or symbol is fully decoded. The codeword decision block 618 can determine if the soft bits in the soft information of the primary codeword estimation 358 of FIG. 3 and the parallel codeword estimation 370 of FIG. 3 have been fully decoded.

For example, when the primary codeword estimation 358 and the parallel codeword estimation 370 are determined to be fully decoded, the codeword decision block 618 can pass the soft information for the primary codeword estimation 358 of and the parallel codeword estimation 370 to a hard information block 620.

When the primary codeword estimation 358 and the parallel codeword estimation 370 are not fully decoded, the codeword decision block 618 can pass the soft information for the primary codeword estimation 358 of and the parallel codeword estimation 370 to a codeword index change block 622.

The communication system 100 can include the codeword index change block 622 coupled to the codeword decision block 618. The codeword index change block 622 is for changing calculation of soft information for one codeword to calculation of soft information to another codeword. For example, when the codeword decision block 618 determines that the soft information for one of the codewords is fully decoded but the soft information for the other codeword is not fully decoded, the codeword index change block 622 can calculate the soft information for the other codeword.

As a specific example, the primary codeword estimation 358 can have a codeword index of "0" and the parallel codeword estimation 370 can have a codeword index of "1". When the codeword decision block 618 determines that the primary codeword estimation 358 is fully decoded but the parallel codeword estimation 370 is not fully decoded, the codeword index change block 622 can change the codeword index from "0" to "1" to indicate a change in decoding of the primary codeword estimation 358 to the parallel codeword estimation 370.

The communication system 100 can include a soft estimate block 624, coupled to the codeword index change block 622. The soft estimate block 624 is for receiving or estimating the soft information of a codeword for use in subsequent interference cancellation. For example when the communication system 100 is implementing the primary digital detection module 322 to calculate the primary detected soft information 360, the soft estimate block 624 can implement the modules of the parallel iterative feedback path 340 to calculate, receive, or a combination thereof, the parallel channel soft information 376.

The communication system 100 can include an interference cancellation block 626 coupled to the soft estimate block 624. The interference cancellation block 626 can implement the primary interference cancellation module 424 of FIG. 4 and the parallel interference cancellation module of FIG. 5. The interference cancellation block 626 can output the primary codeword signal 436 of FIG. 4 and the parallel codeword signal 536 of FIG. 5.

The communication system 100 can include a residual interference block 628, coupled to the interference cancellation block 626. The residual interference block 628 can receive the primary codeword signal 436 and the parallel codeword signal 536. The residual interference block 628 can implement the primary signal whitening module 426 of FIG. 4 and the parallel signal whitening module 526 of FIG. 5. The residual interference block 628 can output the primary whitened codeword estimation 448 of FIG. 4 and the parallel whitened codeword estimation 548 of FIG. 5.

The communication system 100 can include a modified codeword detection block 630, coupled to the residual interference block 628. The modified codeword detection block 630 can implement the primary modified detection module 428 of FIG. 4 and the parallel modified detection module 528 of FIG. 5.

The communication system 100 can include a soft information calculation block 632, coupled to the modified codeword detection block 630. The soft information calculation block 632 can implement the subsequent primary soft information module 452 of FIG. 4 and the subsequent parallel soft information module 552 of FIG. 5.

The communication system 100 can perform a number of iterations through the codeword decoder block 616, the codeword decision block 618, the codeword index change block 622, the soft estimate block 624, the interference cancellation block 626, the residual interference block 628, the modified codeword detection block 630, and the soft information calculation block 632 until the codeword decision block 618 determines that the primary codeword estimation 358 and the parallel codeword estimation 370 are fully decoded.

Once the primary codeword estimation 358 and the parallel codeword estimation 370 are fully decoded, the hard information block 620 can implement the primary hard information module 366 and the parallel hard information module 378. The hard information block 620 can output the primary hard information 368 and the parallel hard information 380.

The hard information block 620 can implement the Primary hard information module 366 and the parallel hard information module 378

Figure 7:
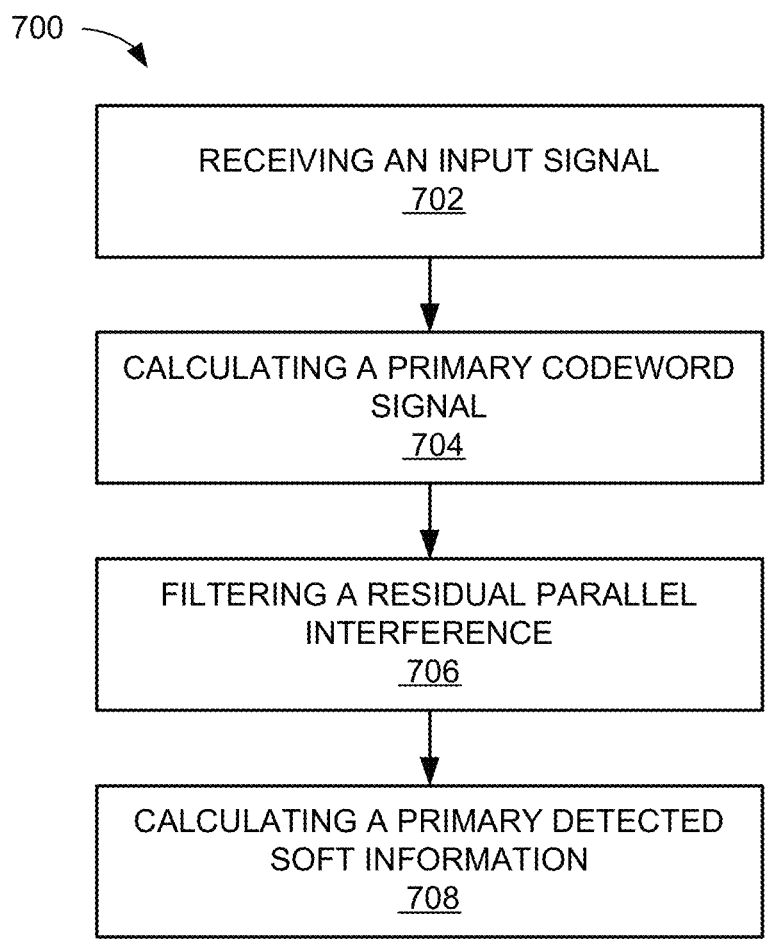
FIG. 7 is a flow chart of a method of operation of the communication system in a further embodiment of the present invention.

Referring now to FIG. 7, therein is shown a flow chart of a method 700 of operation of the communication system 100 in a further embodiment of the present invention. The method 700 includes: receiving an input signal having an input primary codeword and an input parallel codeword in a block 702; calculating a primary codeword signal by removing a parallel soft information average of the input parallel codeword from the input signal in a block 704; filtering a residual parallel interference of the input parallel codeword from the primary codeword signal with a primary whitening filter to generate a primary codeword estimation of the input primary codeword in a block 706; and calculating a primary detected soft information for the primary codeword estimation for communicating with a device in a block 708.

Yet other important aspects of the embodiments include that it valuably supports and services the historical trend of reducing costs, simplifying systems, and increasing performance.

These and other valuable aspects of the embodiments consequently further the state of the technology to at least the next level.

Thus, it has been discovered that the communication system of the present invention furnishes important and heretofore unknown and unavailable solutions, capabilities, and functional aspects for improving reliability in systems. The resulting processes and configurations are straightforward, cost-effective, uncomplicated, highly versatile, and effective, can be implemented by adapting known technologies, and are thus readily suited for efficiently and economically manufacturing communication system.

Another important aspect of the present invention is that it valuably supports and services the historical trend of reducing costs, simplifying systems, and increasing performance.

These and other valuable aspects of the present invention consequently further the state of the technology to at least the next level.

While the invention has been described in conjunction with a specific best mode, it is to be understood that many alternatives, modifications, and variations will be apparent to those skilled in the art in light of the aforegoing description. Accordingly, it is intended to embrace all such alternatives, modifications, and variations that fall within the scope of the included claims. All matters hithertofore set forth herein or shown in the accompanying drawings are to be interpreted in an illustrative and non-limiting sense.

What is claimed is:

1. A method of operation of a communication system comprising:
    receiving an input signal having an input primary codeword and an input parallel codeword;
    calculating a primary codeword signal by removing a parallel soft information average of the input parallel codeword from the input signal;
    filtering a residual parallel interference of the input parallel codeword from the primary codeword signal with a primary whitening filter to generate a primary codeword estimation of the input primary codeword; and
    calculating a primary detected soft information for the primary codeword estimation for communicating with a device.

2. The method as claimed in claim 1 further comprising calculating the parallel soft information average based on a parallel channel soft information of the input parallel codeword.

3. The method as claimed in claim 1 wherein filtering with the primary whitening filter includes filtering with the primary whitening filter based on a parallel channel characterization of the input parallel codeword.

4. The method as claimed in claim 1 wherein calculating the primary codeword estimation includes calculating the primary codeword estimation based on a primary whitened codeword estimation.

5. The method as claimed in claim 1 further comprising:
    calculating a first instance of the primary detected soft information from the input signal; and
    calculating a subsequent instance of the primary detected soft information based on the primary codeword signal.

6. A method of operation of a communication system comprising:
    receiving an input signal having an input primary codeword and an input parallel codeword;
    calculating a primary codeword signal by removing a parallel soft information average of the input parallel codeword from the input signal;
    filtering residual parallel interference of the input parallel codeword from the primary codeword signal with a primary whitening filter to generate a primary codeword estimation of the input primary codeword;
    calculating a primary detected soft information for the primary codeword estimation; and
    calculating a primary channel soft information of the input primary codeword based on the primary detected soft information for communicating with a device.

7. The method as claimed in claim 6 further comprising calculating a parallel detected soft information of the input parallel codeword based on the primary channel soft information.

8. The method as claimed in claim 6 wherein calculating the primary detected soft information includes calculating a subsequent instance of the primary detected soft information based on the primary channel soft information.

9. The method as claimed in claim 6 wherein calculating the primary detected soft information includes calculating the primary detected soft information with a primary iterative feedback path.

10. The method as claimed in claim 6 further comprising calculating a primary hard information for the input primary codeword based on the primary detected soft information or the primary channel soft information.

11. A communication system comprising:
    a signal receiver module for receiving an input signal having an input primary codeword and an input parallel codeword;
    an primary interference cancellation module, coupled to the signal receiver module, for calculating a primary codeword signal by removing a parallel soft information average of the input parallel codeword from the input signal;
    a primary signal whitening module, coupled to the primary interference cancellation module, for filtering a residual parallel interference of the input parallel codeword from the primary codeword signal with a primary whitening filter to generate a primary codeword estimation of the input primary codeword; and
    a primary modified detection module, coupled to the primary signal whitening module, for calculating a primary detected soft information for the primary codeword estimation for communicating with a device.

12. The system as claimed in claim 11 further comprising a parallel soft information average module, coupled to the primary interference cancellation module, for calculating the parallel soft information average based on a parallel channel soft information of the input parallel codeword.

13. The system as claimed in claim 11 wherein the primary signal whitening module includes the primary whitening filter based on a parallel channel characterization of the input parallel codeword.

14. The system as claimed in claim 11 wherein the primary modified detection module is for calculating the primary codeword estimation based on a primary whitened codeword estimation.

15. The system as claimed in claim 11 further comprising:
    a primary initial detection module, coupled to the signal receiver module, for calculating a first instance of the primary detected soft information from the input signal; and
wherein the primary modified detection module is for calculating a subsequent instance of the primary detected soft information based on the primary codeword signal.

16. The system as claimed in claim 11 further comprising a primary channel analysis module, coupled to the signal receiver module, for calculating a primary channel soft information of the input primary codeword based on the primary detected soft information.

17. The system as claimed in claim 16 further comprising a parallel digital detection module, coupled to the signal receiver module, for calculating a parallel detected soft information of the input parallel codeword based on the primary channel soft information.

18. The system as claimed in claim 16 further comprising a subsequent primary soft information module, coupled to the primary modified detection module, for calculating a subsequent instance of the primary detected soft information based on the primary channel soft information.

19. The system as claimed in claim 16 wherein the primary channel analysis module is coupled to a primary digital detection module, having the primary modified detection module, to form a primary iterative feedback path calculating the primary detected soft information.

20. The system as claimed in claim 16 further comprising a primary hard information module, coupled to primary channel analysis module, for calculating a primary hard information for the input primary codeword based on the primary detected soft information.

* * * * *